United States Patent
Yamazaki et al.

Patent Number: 5,731,528
Date of Patent: Mar. 24, 1998

[54] ROPE TENSION MEASURING APPARATUS FOR USE WITH AN ELEVATOR

[75] Inventors: Yoshiaki Yamazaki; Hiroki Itakura, both of Tokyo, Japan

[73] Assignees: Mitsubishi Denki Kabushiki Kaisha; Mitsubishi Electric Building Techno-Service Co., Ltd., both of Tokyo, Japan

[21] Appl. No.: 746,703

[22] Filed: Nov. 15, 1996

[30] Foreign Application Priority Data

Nov. 17, 1995 [JP] Japan ................... 7-299866

[51] Int. Cl.[6] ........................ G01L 5/00
[52] U.S. Cl. ................... 73/862.41; 73/862.451; 73/828
[58] Field of Search ............ 73/826, 828, 841, 73/862.391, 862.392, 862.41, 862.451, 862.471, 862.473

[56] References Cited

U.S. PATENT DOCUMENTS

| | | | |
|---|---|---|---|
| 4,979,125 | 12/1990 | Kwun et al. | 73/600 |
| 5,359,904 | 11/1994 | Luukkala | 73/862.391 |
| 5,454,272 | 10/1995 | Miller et al. | 73/862.391 |

FOREIGN PATENT DOCUMENTS

| | | |
|---|---|---|
| 5-105349 | 4/1993 | Japan. |
| 8-110276 | 4/1996 | Japan. |
| 08178771 A | 7/1996 | Japan. |

OTHER PUBLICATIONS

Sonic Tension Meter STM303, by Unitta, Catalog 501., Jul. '92.

*Primary Examiner*—George M. Dombroske
*Assistant Examiner*—Max H. Noori
*Attorney, Agent, or Firm*—Sughrue, Mion, Zinn, Macpeak & Seas, PLLC

[57] ABSTRACT

A rope tension measuring apparatus for measuring rope tension of a plurality of main ropes that suspend an elevator car and a counterweight and adjustment quantities of tension adjusting springs for the main ropes. The apparatus comprises a portable measuring device comprising traveling-wave detector means directly attached to the elevator main rope for detecting a traveling wave that is generated by applying an instantaneous displacement to the main rope, traveling-wave passage velocity computing means for measuring the passage velocity of the traveling wave, rope tension computing means for computing the rope tension based on the passage velocity, spring adjustment quantity computing means for computing a spring adjustment quantity for the rope tension adjusting springs, and output means for outputting these computed results, based on the variation of passage velocities of the plurality of main ropes. The apparatus works excellently with a high-lift elevator with its sensor easy to mount, and performs tension adjustment efficiently.

12 Claims, 22 Drawing Sheets

FIG. 1A
FIG. 1B
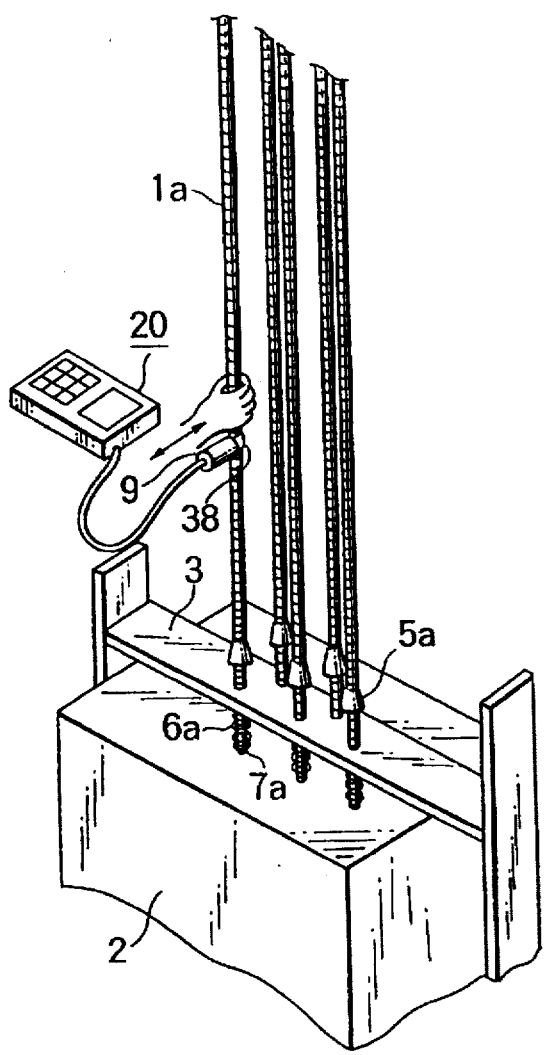
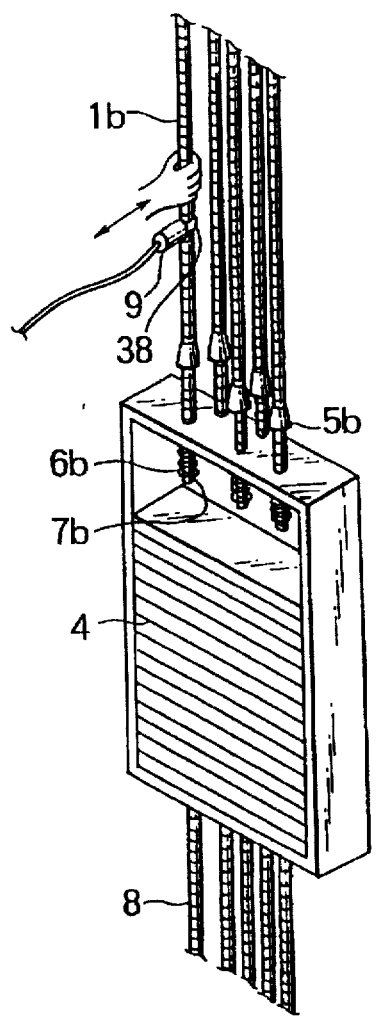

ROPE TENSION MEASURING APPARATUS FOR USE WITH AN ELEVATOR

BACKGROUND OF THE INVENTION

1. Field of the Invention

The present invention relates to a rope tension measuring apparatus for measuring rope tension of a plurality of main ropes that suspend a car and a counterweight in an elevator.

2. Description of the Related Art

Steel-wire ropes are widely used as a principal hoist rope for suspending an elevator car and a counterweight. A high-speed and high-lift elevator having a heavy car and working in a tall hoistway employs a plurality of hoist ropes, typically 8 to 10 ropes. As buildings today become taller, elevators incorporate high-speed and high-lift design.

Tension of the hoist rope of such an elevator is an important characteristic that determines the comfortable transportation of the elevator to ride in. For this reason, there is a need for improvements in accuracy and efficiency in the measurement of tension. When the hoist rope that is wound by the main motor of the elevator is subject to an unbalance in tension, wear or break of rope strands or untwisting of the rope takes place. Such irregularities not only adversely affect the life of the rope, but also contribute to rapid wear of the sheave groove of a hoist. Once any partial wear starts in the sheave, the hoist rope that is paid out suffers difference in length particularly in a high-lift elevator system, and the unbalance in tension is increased even further. Since the unbalance in tension is proportional to the overall travel of the car in raising and lowering movement, periodic check and adjustment of tension are required particularly in high-lift elevators to correct unbalanced tension due to aging.

Such a check and adjustment operation is frequently manually performed on a trial and error basis, requiring a great deal of man-power and time. In view of this, Japanese Unexamined Patent Publication No. 5-105349 has proposed a method and apparatus in which an electromagnetic coil picks up an electrical signal corresponding to the oscillation in the middle of the rope and the tension of the rope is calculated based on the electrical signal.

FIG. 26 is a vertical cross-sectional view of a 2:1 roping elevator, which employs the rope tension measuring apparatus disclosed in Japanese Unexamined Patent Publication No. 5-105349. FIG. 27 is an enlarged view of a portion B in FIG. 26 showing the major portion of the rope tension measuring apparatus.

In the 2:1 roping elevator shown in FIG. 26, the hoist rope (wire rope) has, on both ends, rope sockets 5a, 5b attached and then supported by the floor 27 of a utility room 26 by means of a car side main rope tension adjusting shackle spring 6a, and a counterweight side main rope tension adjusting shackle spring 6b.

The main rope 1 is driven by a rope pulley (drive sheave) 21 of a hoist installed in the utility room 26 and paid out by a guide pulley 22 of the hoist. With the hoist rope pulley (drive sheave) 21 positioned midway, the main rope 1 is wrapped around, on one side, a car-top sheave 28 to which a car 2 is attached from below and, on the other side, a counterweight-top sheave 29 to which a counterweight (balancing weight) 4 is attached from below.

The car 2 and the counterweight 4 are stopped at a face-to-face position, a technician mounts a oscillation frequency detection means 30 within his reach above the car 2, with its magnet (magnetic material) 30a circling the main rope 1 1. The technician on the car 2 manually pulls the main rope 1 and then lets go his hold of the main rope 1 to cause the rope midway to oscillate. Tension of the main rope 1 is determined based on the variation in magnetic flux taking place in the magnet (magnetic material) 30a.

A voltage is induced in a coil 30b in response to the variation in magnetic flux in the magnet (magnetic material) 30a, an electric signal derived from the induced voltage is output from the coil 30b, and the electric signal is fed to computing means 34 after being amplified by an amplifier 32 of a processor unit 31. The computing means 34 determines the frequency f of the oscillation based on the amplified electric signal, and then computes rope tension T from the following equation.

$$T = \left(\frac{\rho}{g}\right) \cdot (2 \cdot L \cdot f)^2 \qquad (1)$$

where $\rho$ is the density of the rope, and g is the acceleration of gravity. Since the density of the rope $\rho$ and the acceleration of gravity g are constants, they are beforehand stored in the computing means 34. In the above equation, L is the length of the rope 1, and the length L of the rope is determined from the following equation (2) and the resulting rope length information is then fed via an input device 33.

$$L = \left(\frac{S}{2}\right) + H \qquad (2)$$

where S is the distance run of the car 2, and H is the distance between the stop position of the car 2 at its highest floor and the floor 27 of the utility room 26.

An output means 35 outputs a computed result provided by the computing means 34.

The known apparatus thus constructed can detect the frequency of oscillation of the main rope 1 in its middle point. Since the position of detection of oscillation frequency is not related to the mounting position of the rope socket 5a at one end of the main rope 1, tension of the main rope 1 can be measured above the car 2 even in the 2:1 roping elevator.

The non-contact permanent magnet 30a is used to measure the oscillation frequency of the main rope 1 and no particular requirement is imposed on the position of detection The technician can easily measure tension of the main rope 1 at any convenient position. Since the processor unit 31 is a unit separate from the oscillation frequency detector means 30, the processor unit 31 may be set up in a convenient location where a technician can observe it at ease. The tension of the rope 1 is thus easily checked.

In the above known apparatus, the 2:1 roping elevator is discussed. In a 1:1 roping elevator, a technician can also measure tension of the main rope 1 above the car 2.

The above known rope tension measuring apparatus for the elevator have the following disadvantages, however.

(1) When the rope tension measuring apparatus is used with a high-lilt elevator, a steady-state oscillation (standing wave) as shown in FIG. 26 is less likely to take place because of the extremely long rope length in the high-lilt elevator. In practice, individual travelling waves take place and propagate along the main rope 1. For this reason, measuring accurately the pass of the travelling waves is more important than measuring the oscillation frequency of the main rope 1.

(2) When the rope is forced to oscillate, the amplitude of the oscillation of the rope becomes large in the high-lift elevator having the extremely long main rope. A large-amplitude oscillation renders inappropriate the detection using a non-contact sensor such as an electromagnetic coil. If the rope is forced to oscillate at a small magnitude, the resulting oscillation has a smaller amplitude but with a degraded measurement accuracy.

(3) To measure the oscillation of the rope, the portions of the rope other than the middle portion is not suitable as a point of measurement.

(4) Since the non-contact sensor with the electromagnetic coil is kept from contacting the rope 1, mounting the sensor requires a particular consideration. Furthermore, measuring a plurality of ropes at a time is difficult.

(5) The prior art rope tension measuring apparatus for an elevator determines rope tension as a result of computation. Thus, if the rope tension value of each main rope is determined, the actual adjustment quantity for the rope tension adjusting springs is not known. With the known rope tension measuring apparatus, therefore, a highly accurate rope tension adjustment is impracticable.

(6) To measure rope tension at an arbitrary floor, the rope length at the arbitrary floor must be known. It is impracticable to measure actually the rope length on the car top at the arbitrary floor, and thus to measure rope tension at the arbitrary floor.

(7) During measurement, a technician needs to observe the processor unit 31 each time, and this makes the prior art apparatus unsuitable for a car-top measurement operation.

SUMMARY OF THE INVENTION

Accordingly, it is an object of the present invention to provide an elevator rope tension measuring apparatus that offers an improved measurement accuracy even in a high-lift elevator, is free from sensor mounting problem and adjustment quantity problem, and offers improved accuracy and efficiency in the adjustment operation of the elevator rope tension.

The rope tension measuring apparatus for use with an elevator of the present invention of the type that measures the tension of a main rope that suspends a car and a counterweight, comprises travelling wave detector means for detecting a travelling wave occurring in the main rope in response to a displacement that is applied to the main rope, and a portable measuring device that computes and outputs an adjustment quantity in rope tension based on the output from the travelling wave detector means.

As the travelling wave detector means, acceleration detector means is employed to detect the condition of the pass of the travelling wave based on the detection of the maximum amplitude of the acceleration of the travelling wave that occurs in the horizontal direction of the main rope each time the travelling wave goes and returns.

The rope tension measuring apparatus further comprises mounting means for mounting the travelling wave detector means in a direction perpendicular to the plane of the parallel arrangement of a plurality of main ropes.

The portable measuring device comprises traveling-wave passage information computing means for computing passage information of the traveling wave based on the output from the traveling wave detector means, adjustment quantity computing means for computing a rope tension adjustment quantity based on the traveling-wave passage information computed by the traveling-wave passage information computing means, and output means for outputting the computed result of adjustment quantity.

The portable measuring device further comprises signal filter means for filtering the output from the traveling wave detector means to output a waveform, the acceleration peak of which is easily identifiable, to the traveling-wave passage information computing means.

The portable measuring device further comprises traveling-wave passage notification means which makes a sound to inform of the passage of the traveling wave based on the output from the traveling-wave passage information computing means.

The portable measuring device further comprises alarm sound generator means for sounding an alarm based on the output from the adjustment quantity computing means when the adjustment quantity exceeds a set level.

The portable measuring device further comprises power supply means for supplying power to the internal arrangements in the traveling wave detector means and the portable measuring device.

The traveling-wave passage information computing means estimates the return time of the traveling wave based on one of a maximum acceleration peak value search method, a power spectrum computing method using the fast Fourier transform, an auto-correlation function computing method, and a cepstrum computing method, and computes the passage velocity of the traveling wave.

The traveling-wave passage information computing means comprises traveling-wave passage velocity computing means for computing the passage velocity of the traveling wave based on the output from the traveling wave detector means, and the adjustment quantity computing means comprises rope tension computing means for computing the tension of the main rope based on the passage velocity of the traveling wave, and the output means outputs the computation result of rope tension.

The traveling-wave passage information computing means comprises traveling-wave return time computing means for computing the return time of the traveling wave based on the output from the traveling wave detector means, and the adjustment quantity computing means comprises spring adjustment quantity computing means for computing an adjustment quantity for the main rope tension adjusting spring, and the output means outputs the computation result of spring adjustment quantity.

The spring adjustment quantity computing means comprises a main rope length computing unit for computing the length of the main rope at an arbitrary position of measurement based on the overall weight of the car, and a spring adjustment quantity computing unit for computing the adjustment quantity for a main rope tension adjusting spring based on the computed length of the main rope.

The spring adjustment quantity computing means comprises a spring adjustment quantity computing unit for computing the adjustment quantity for the main rope tension adjusting spring based on an separation between different points of measurement along the main rope and a difference between passage times of the traveling wave at the points Of measurement along the main rope.

The spring adjustment quantity means comprises a return time computing unit for computing the return time of the traveling wave for all main ropes when the spring is adjusted according to the computed spring adjustment quantity, an assessment value computing unit for computing the assessment of variation based on the maximum and minimum values of the return times, an adjustment rope count computing means for computing the number of adjustment ropes to be adjusted, the computed assessment value of which falls within an adjustment target range, and a spring adjustment quantity indicator for indicating the spring adjustment quantities of the adjustment ropes in the order of decreasing magnitude of the absolute values of the spring adjustment quantities.

The spring adjustment computing means comprises first and second partial wear computing means for computing a partial wear of a hoist rope pulley for driving the main rope by wrapping, according to the difference between the spring adjustment quantities of springs of a car side and a counterweight side measured at different points of measurement along the main rope, and the output means outputs the computation result of these partial wear quantities.

The rope tension measuring apparatus for use with an elevator of the present invention of the type that measures the tension of a main rope that suspends a car and a counterweight, comprises first oscillation detector means for detecting a rope oscillation occurring in the main rope while the elevator runs, computing means for computing a rope tension of the main rope or an adjustment quantity for a main rope tension adjusting spring, and output means for outputting the computation result from the computing means.

The rope tension measuring apparatus for use with an elevator of the present invention of the type that measures the tension of a main rope that suspends a car and a counterweight, comprises second oscillation detector means for detecting a rope oscillation occurring in the main rope when the elevator starts running from a stop state, or when the elevator stops running from a running state, computing means for computing a rope tension of the main rope or an adjustment quantity for a rope tension adjusting spring and output means for outputting the computation result from the computing means.

BRIEF DESCRIPTION OF THE DRAWINGS

FIGS. 1A and 1B are perspective views showing the operation of the rope tension measuring apparatus in embodiments 1 and 2 of the present invention, wherein the rope tension measuring apparatus is used at the elevator car and the counterweight in a high-lift elevator.

DESCRIPTION OF THE PREFERRED EMBODIMENTS

Embodiment 1

Figure 2:
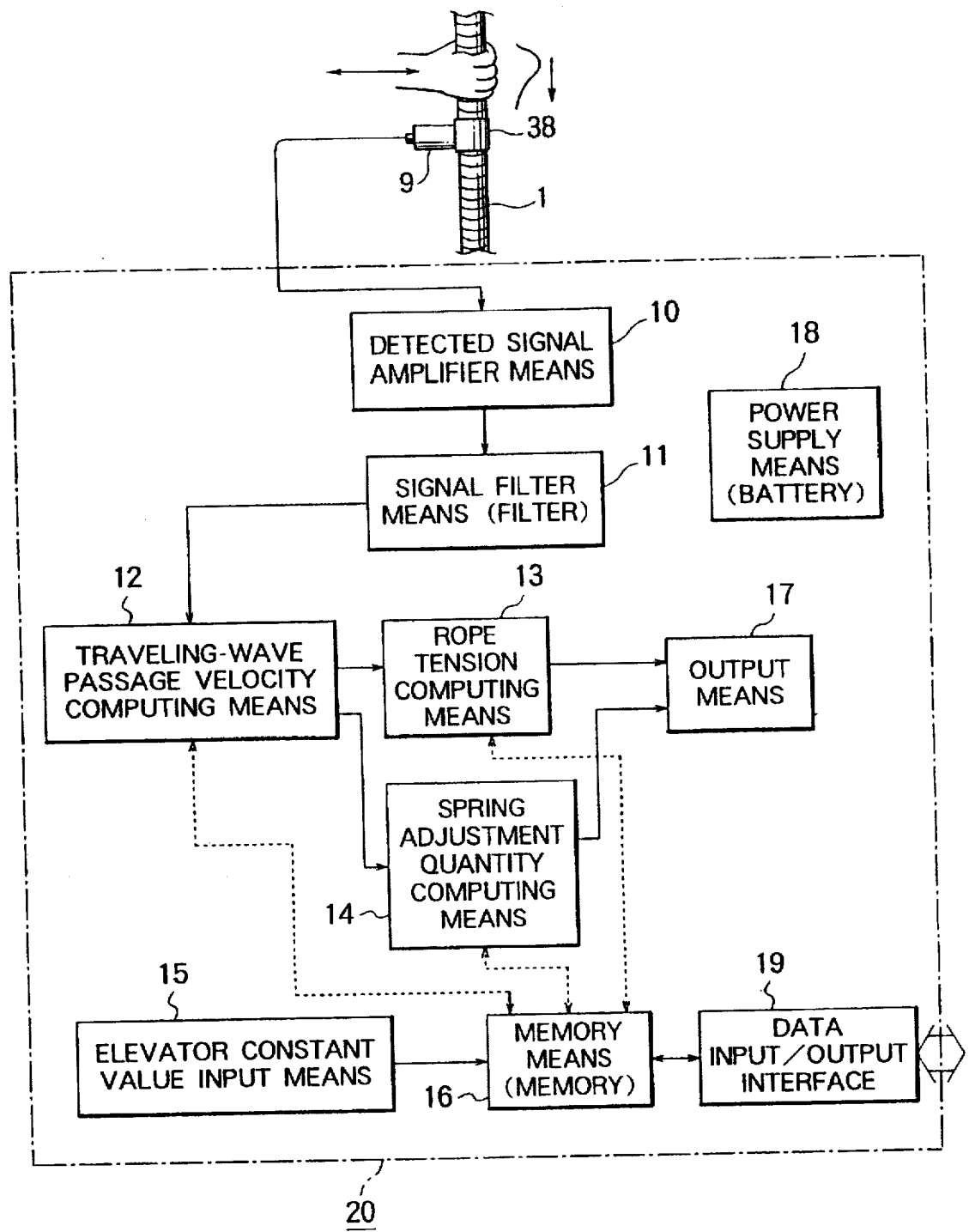
FIG. 2 is a block diagram showing the internal arrangement of the portable measuring device in the embodiments 1 and 2 of the present invention.

Referring now to the drawings, the present invention is discussed.

FIGS. 1A and 1B are perspective views of the rope tension measuring apparatus for use in an elevator in the embodiment 1.

There are shown in FIGS. 1A and 1B, main ropes 1a and 1b, a elevator car 2 that is supported in a vibration-proof fashion by a car frame 3 that hangs suspended from car-side main ropes 1a, a counterweight 4 that hangs suspended from counterweight-side ropes 1b, car-side rope sockets 5a connected to the ends of the car-side ropes 1a, and counterweight-side rope sockets 5b connected to the ends of the counterweight-side ropes 1b.

Also shown are tension adjusting shackle springs 6a for the car-side main ropes compressed between the car frame 3 and tension adjusting nuts 7a for the car-side main ropes, tension adjusting shackle springs 6b for the counterweight-side main ropes compressed between a counterweight frame and tension adjusting nuts 7b for the counterweight-side main ropes, compensating ropes 8 connected to the car 2 and the counterweight 4 from below, traveling wave detector means 9 attached to the main rope 1 in perpendicular to the axial direction of the main rope 1, for detecting the traveling wave occurring in the main rope 1 to which a displacement is exerted, a mounting band 38 for mounting the traveling wave detector means 9 on to the main rope 1 and a portable measuring device 20 for computing and outputting a rope tension adjustment quantity based on the output from the traveling wave detector means 9.

In the embodiment 1 shown in FIGS. 1A and 1B, the rope tension measuring apparatus is applied to a 1:1 roping elevator with its car 2 and counterweight 4 stopped at the same level. The number of main ropes 1 is not limited to 5, and no particular limitation is set in the number of main ropes.

The portable measuring device 20 has the internal arrangement as shown in FIG. 2.

There are shown, in FIG. 2, detected signal amplifier means 10 for amplifying the output signal from the traveling wave detector means 9, signal filter means (filter) 11 for filtering the signal of the traveling wave detector means 9 which has been amplified by the detected signal amplifier means 10, traveling-wave passage velocity computing means 12 as traveling-wave passage information computing means for computing the passage information of the traveling wave occurring in the main rope 1 based on the signal of the traveling wave detector means 9 which has been filtered by the signal filter means 11, rope tension computing means 13 for computing the rope tension of the main rope 1 based on the traveling-wave passage velocity output from the traveling-wave passage velocity computing means 12, and elevator constant value input means 15 for inputting a physical constant value of the elevator.

FIG. 2 also shows memory means (memory) 16 for storing the constant value input by the elevator constant value input means 15 and the computation result from the rope tension computing means 13, output means 17 for outputting the computation result from the rope tension computing means 13, power supply means (battery) 18 for supplying power to detected signal amplifier means 10 that is the internal arrangement of the traveling wave detector means 9 and the portable measuring device 20, signal filter means 11, traveling-wave passage velocity computing means 12, rope tension computing means 13, elevator constant value input means 15, memory means 16, output means 17 and the like, and a data input/output interface 19 for exchanging data stored in the memory means 16.

FIG. 2 also shows spring adjustment quantity computing means 14 for computing an adjustment quantity of the main rope tension adjusting nut 7 (collectively designating reference numerals of 7a, 7b) that tightens the main rope tension adjusting shackle spring 6 (collectively designating reference numerals of 6a, 6b). The spring adjustment quantity computing means 14 is connected to the traveling-wave passage velocity computing means 12, memory means 16 and output means 17. In this embodiment, however, the spring adjustment quantity computing means 14 features no spring adjustment function. The operation and function of the spring adjustment quantity computing means 14 will be discussed later in connection with the embodiment 2. If the portable measuring device 20 features the spring adjustment function of the spring adjustment quantity computing means 14, the traveling-wave passage velocity computing means 12 as the traveling-wave passage information computing means works as traveling wave return time computing means that computes the return time of the traveling wave to be described later, as the traveling-wave passage information and the spring adjustment quantity computing means 14 computes the adjustment quantity for the main rope tension adjusting spring based on the return time of the traveling wave.

Figure 3A:
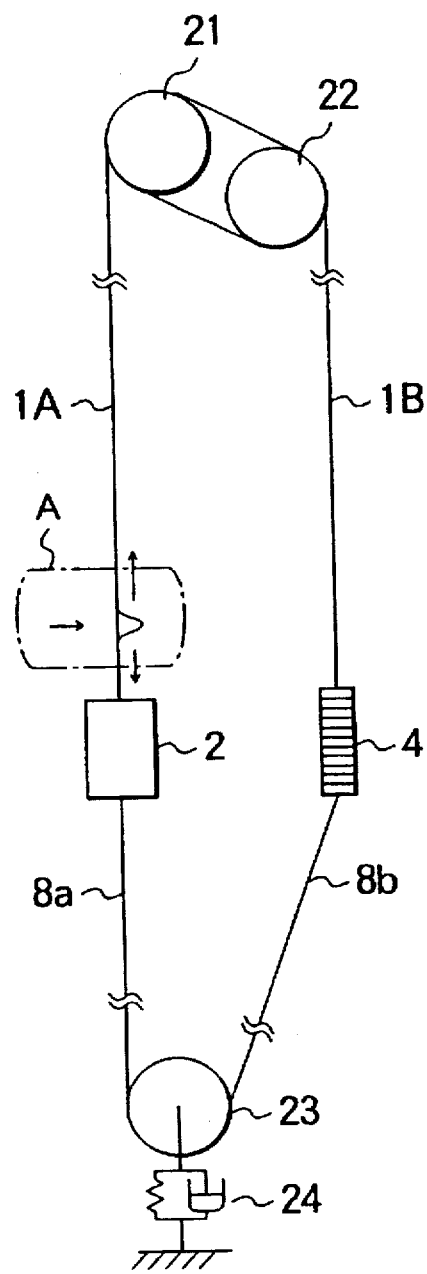
FIGS. 3A and 3B show the propagation of the traveling wave to describe the principle of measurement in which the embodiment 1 of the present invention is implemented in a 1:1 roping elevator.

The elevator rope tension measuring apparatus of the embodiment 1 thus constructed is applied to a high-lift 1:1 roping elevator as shown in FIG. 3A. The main rope is forced to be displaced or oscillated to generate a traveling wave.

Figure 3B:
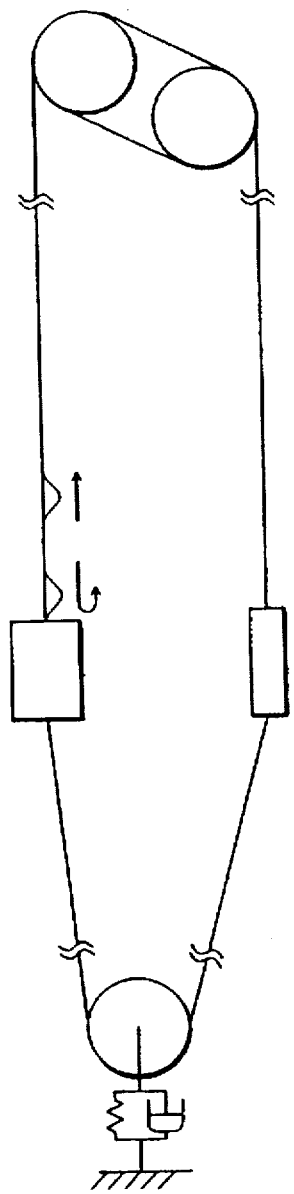
Figures 4A, 4B, 4C, 4D:
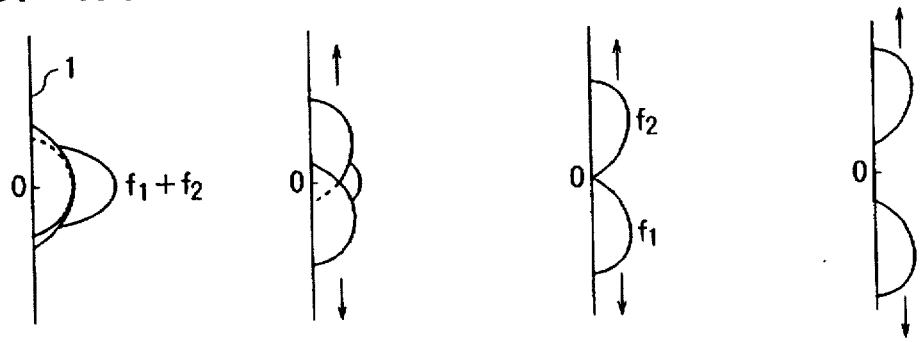
FIGS. 4A through 4D are explanatory views showing that the traveling wave occurring in the embodiment 1 of the present invention propagates along the main rope.

FIGS. 3A and 3B show the propagation of the traveling wave to describe the principle of measurement in which the elevator rope tension measuring apparatus of the embodiment 1 is applied to the high-lift 1:1 roping elevator. There are shown herein a hoist rope pulley 21 for driving the main ropes 1a, 1b by wrapping, a guide sheave 22, a compensating sheave 23 around which compensating ropes 8a, 8b wrap, a compensating sheave damper 24 for connecting the compensating sheave 23 to the ground.

Figure 8:
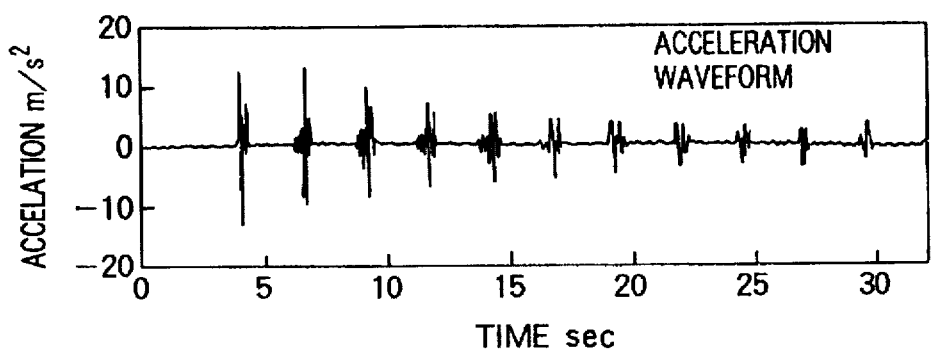
FIG. 8 shows an example of the acceleration waveform of the traveling wave occurring in embodiments 1 and 3 of the present invention.
Figure 9A:
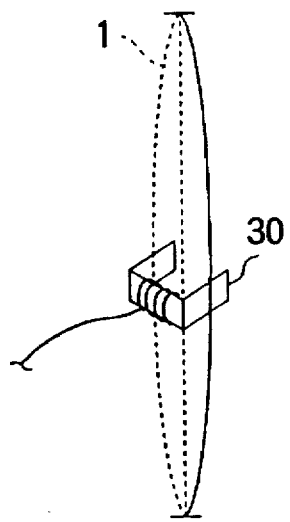
FIGS. 9A through 9C are explanatory views of the embodiment 1 of the present invention in comparison with the prior art, wherein the oscillation frequency detector means of the prior art is used to measure the steady-state oscillation occurring when the length of the main rope is short while the traveling wave detector means of the present invention is used to measure the traveling wave along the main rope.
Figure 9B:
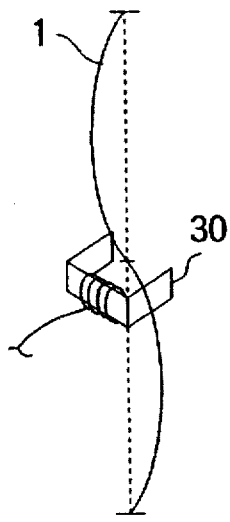
Figure 9C:
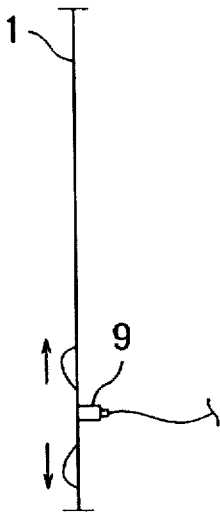

FIGS. 4A through 7D are explanatory views illustrating the propagation of the traveling wave along the main rope 1 occurring in FIGS. 3A and 3B. FIG. 8 shows an example of the acceleration waveform of the traveling wave measured by the traveling wave detector means 9. FIGS. 9A through 9C show the difference between the prior art oscillation wave measurement and the traveling wave measurement according to the present invention.

The operation of the device is now discussed referring to FIG. 3A through FIG. 9C.

Generally, a steel-wire rope is used as the main rope 1 that suspends the elevator car 2 and the counterweight 4. In a high-speed, high-lift elevator with its car 2 heavy and long vertical travel a plurality of main ropes 1, typically 8 to 10 main ropes, are used. If there is an unbalance in tension in the main rope 1 wound up by the hoist rope pulley 21, wear or break of rope strands or untwisting of the rope takes place. Such irregularities not only adversely affect the life of the rope, but also contribute to rapid wear of the groove of the sheave of the hoist rope pulley 21. Once any partial wear starts in the sheave of the hoist rope pulley 21, the hoist rope that is paid out suffers difference in length particularly in a long vertical travel, and the unbalance in tension of the main rope is further increased. Since the unbalance in tension is proportional to the overall distance run of the car in raising and lowering movement, periodic check and adjustment of tension are required particularly in high-lift elevators to correct unbalanced tension due to aging.

The tension check and adjustment operation of the main rope 1 according to the embodiment 1 is performed as follows.

First, a technician lands on the top of the car 2, or the door of the elevator at a stop floor is opened with the car 2 lowered by some distance from the floor. The traveling wave detector means 9 is firmly fastened to the main rope 1a at a right angle within easy reach of the technician, for example, at a level 1 m high from the car rooftop. There is no particular requirement for the mounting position of the traveling wave detector means 9. The traveling wave detector means 9 can be mounted at any level on the main rope 1a where ease of the measurement operation is assured.

The technician gets hold the main rope 1 to which the traveling wave detector means 9 is firmly fastened and exerts an instantaneous displacement as large as few centimeters to the main rope 1. A traveling wave is thus generated. The main rope 1 may be or may not be released immediately after getting hold of the main rope 1. There is no particular requirement in the manner of how the displacement is exerted to the main rope. Of importance is that once the displacement is applied no disturbances are applied to the main rope not to disturb the traveling wave.

Although the traveling wave generated in the main rope 1 is a single one at the moment of generation as shown in FIG. 3A, it is split into two isolated traveling waves, one above and the other below the point of application immediately after the application of displacement or oscillation as shown in FIG. 3B.

FIGS. 4A through 4D are enlarged views of splitting traveling waves. The single wave generated in the main rope 1 gradually splits into a downward traveling wave f1 and an upward traveling wave f2 with time as shown in FIGS. 4A, 4B, 4C and 4D. The upward traveling wave f2 then hits the rope pulley 21 of the hoist while the downward traveling wave f1 hits the car 2.

In practice, the main rope 1 is connected to the car frame 3 through the main rope socket 5, main rope tension adjusting shackle spring 6, and main rope tension adjusting nut 7, and the car frame 3 supports the car 2 in a vibration-proof fashion. For simplicity, these are omitted herein with only the car 2 shown. By a 0 is meant a point of application of displacement.

The downward traveling wave f1 and upward traveling wave f2 hit and are reflected respectively from the car 2 and the hoist rope pulley 21 functioning as a boundary, and then propagate in their return directions.

Figures 5A, 5B, 5C, 5D:
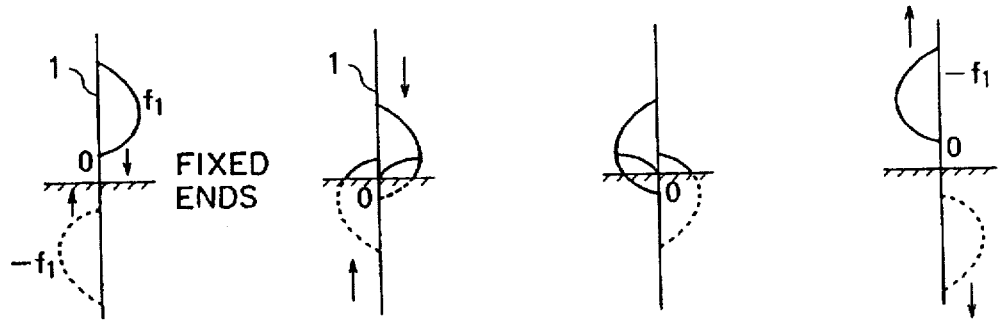
FIGS. 5A through 5D are explanatory views showing that the traveling wave occurring in the embodiment 1 of the present invention propagates along the main rope.

FIGS. 5A through 5D show the reflection of the traveling wave from the car 2 and the hoist rope pulley 21, wherein the car 2 and the hoist rope pulley 21 are so firmly secured in a direction perpendicular to the propagation of the traveling wave that they are regarded as fixed ends. In FIG. 5A, the solid line represents the downward traveling wave f1 propagating downward along the main rope 1, and the broken line represents a reflected wave $-f1$. When the traveling wave hits the fixed end in FIG. 5B, a traveling wave with its phase being opposite is generated. With time as shown in FIGS. 5C and 5D, the traveling wave $-f1$ with opposite phase is generated. The state of reflection becomes slightly different depending on the condition of the fixed rope, and with reflection repeated, the traveling wave f1 and the reflected wave $-f1$ are subject to a slight degree of deformation, though such deformation is not shown in the figures.

Figure 6:
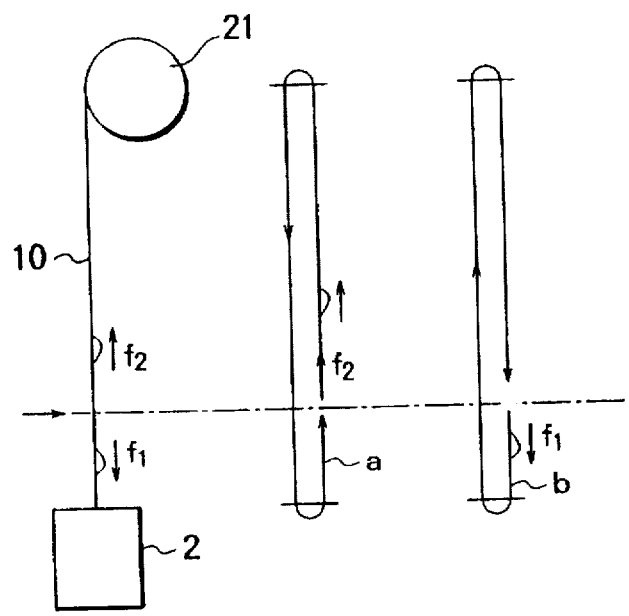
FIG. 6 is an explanatory view showing that the traveling wave occurring in the embodiment 1 of the present invention propagates along the main rope.

FIG. 6 shows the passage and distance of the split traveling waves f1 and f2, a representing the passage of the upward traveling wave f2, and b representing the passage of the downward traveling wave f1. Both impact each other when they return along the main rope 1.

Figures 7A, 7B, 7C, 7D:
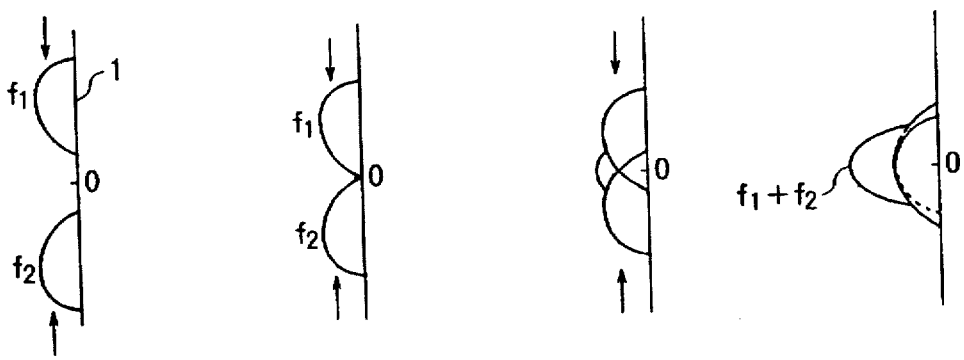
FIGS. 7A through 7D are explanatory views showing that the traveling wave occurring in the embodiment 1 of the present invention propagates along the main rope.

FIGS. 7A through 7D show the change of the traveling waves when they impact each other. With the application of displacement, the traveling wave f1 propagates downward, is reflected by the car 2 for the first time, propagates upward, is reflected by the hoist rope pulley 21 for the second time, and then propagates downward. With the application of displacement, the traveling wave f2 propagates upward, is reflected by the hoist rope pulley 21 for the first time, propagates downward, is reflected by the car 2 for the second time, and propagates upward. Both traveling waves f1 and f2 impact each other at the point of application of displacement 0. FIG. 7A shows both traveling waves before the impact. With time as shown in FIGS. 7B, 7C, and 7D, both traveling waves change. At the moment both traveling waves f1 and f2 are superimposed, a large amplitude of f1 plus f2 results as shown in FIG. 7D. The impact of the traveling waves causing such a large amplitude takes place only when the traveling waves f1 and f2 return to the point of application 0 after one full travel along the main rope 1.

Figure 26:
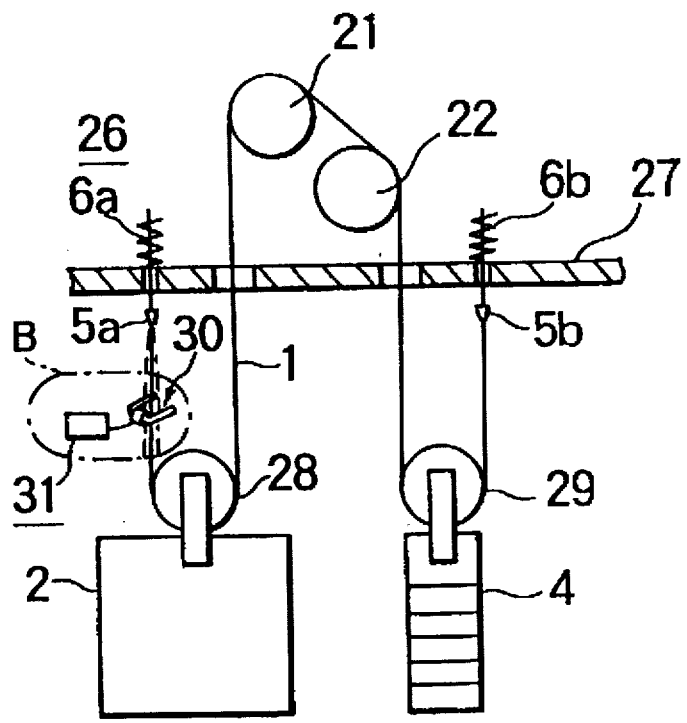
FIG. 26 is the vertical cross-sectional view of the 2:1 roping elevator, in which the prior art elevator rope tension measuring apparatus is incorporated.
Figure 27:
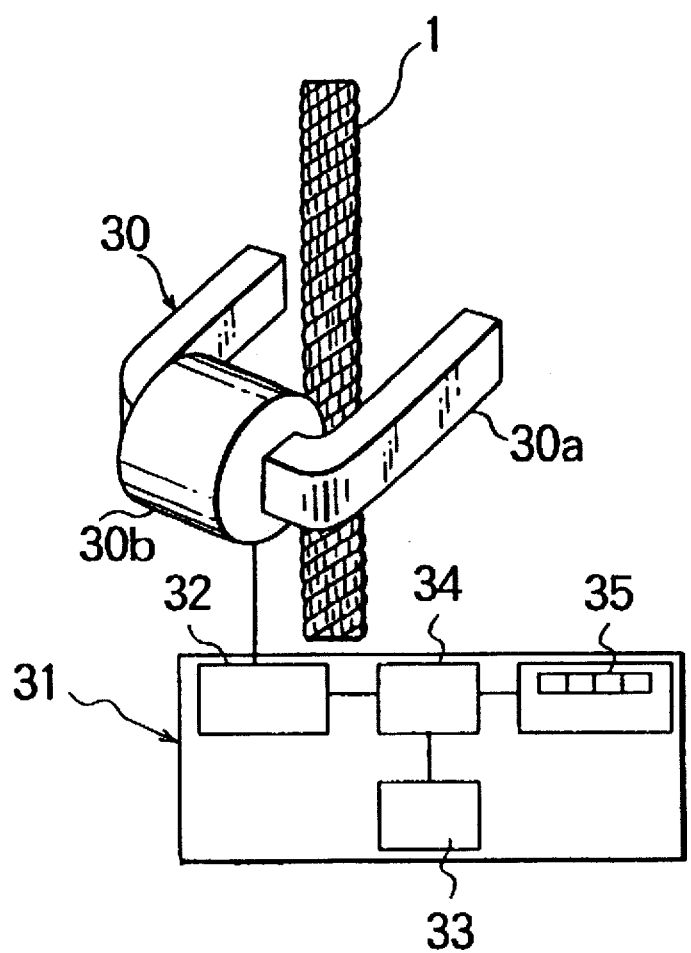
FIG. 27 is the perspective view showing the major portion of the prior art rope tension measuring apparatus.

As described above, it is difficult to generate, in the high-speed, high-lift elevator with a long vertical travel, a steady-state waveform (standing wave), which is generated in the prior art with a low-lift main rope 1 as shown in FIG. 26. By applying a displacement to the main rope, two split traveling waves are generated, and a largest amplitude traveling wave occurs when these two traveling waves impact each other at the point of application. It is necessary to measure instantaneously the largest amplitude.

FIG. 8 shows the waveform of the rope horizontal acceleration arising from the traveling wave that is generated by applying a displacement to the main rope 1, wherein the traveling wave detector means 9 in FIGS. 1A and 1B is used to measure the waveform.

As shown in FIG. 8, the main rope 1 oscillates only at the moment the traveling wave passes the point of the traveling wave detector means 9 rather than oscillates continuously. A maximum acceleration is generated at the moment two traveling waves impact each other at the point of application of displacement after one full travel along the main rope. The amplitude of the merged traveling waves gradually attenuates as the traveling waves repeat propagation and reflection along the main rope 1. Since the passage of the traveling wave is instantaneous, a highly responsive traveling wave detector means 9 is effective in the measurement of the traveling wave.

In the embodiment 1 the position of mount of the traveling wave detector means 9 for measuring the traveling wave generated in the rope 1 is set to be 1 m high above the top of the car 2 or the counterweight 4. Since the measurement according to the principle of the present invention is based the acceleration at the moment the two traveling waves impact each other, any position on the main rope 1 works as a point of measurement as long as the point of application of displacement and the position of mount of the traveling wave detector means 9 are in close vicinity. The point of measurement is not limited to any particular point on the main rope.

FIGS. 9A through 9C illustrate, for comparison, the prior art and the principle of measurement according to the present invention in terms of measurement accuracy. FIGS. 9A and 9B show an arrangement in which the steady-state oscillation (standing wave) generated in the prior art with a short main rope 1 is measured by the oscillation frequency detector means 30. FIG. 9C shows another arrangement in which the traveling waves in the main rope 1 are measured by the traveling wave detector means 9 according to the present invention.

When a primary steady-state oscillation is generated and resides as shown in FIG. 9A, a maximum amplitude is measured with the oscillation frequency detector means 30 mounted on the center of the wave. Thus, the measurement accuracy is high. If a secondary steady-state oscillation happens to occur and resides as shown in FIG. 9B, however, the center becomes the node of the wave, and thus the measurement accuracy of oscillation frequency is lowered. By contrast, the traveling wave measured by the traveling wave detector means 9 of the present invention propagates independently along the main rope 1 as shown in FIG. 9C. Regardless of the position of measurement, a high-accuracy measurement is thus allowed.

The waveform of the traveling wave measured by the traveling wave detector means 9 is converted into the traveling-wave passage velocity by the traveling-wave passage velocity computing means 12 in the portable measuring device 20, and then stored in the memory means 16. When one main rope 1 is finished, the traveling wave detector means 9 may be fastened to the next main rope 1 to continue the measurement of passage velocity of the traveling wave. Such a procedure is repeated until all main ropes 1 are measured. The traveling wave on the main rope 1 is measured by the traveling wave detector means 9. The detected signal from the traveling wave detector means 9 is amplified by the detected signal amplifier means 10 in the portable measuring device 20 shown in FIG. 2. The amplified traveling-wave signal is filtered by the signal filter means 11 to filter out noise and DC drift components.

The traveling-wave signal thus preprocessed is converted into the passage velocity of the traveling wave by the traveling-wave passage velocity computing means 12. The traveling-wave passage velocity $V_i$ is given by equation (3) as follows.

$$v_i = \frac{2l_r}{t_i}, (i = 1, \ldots, n) \tag{3}$$

where $l_r$ is the length of the main rope at the measurement (distance between the car 2 and the hoist rope pulley 21), $t_i$ is the return time of the traveling wave in an i-th main rope 1, and n is the number of main ropes.

The computed traveling-wave passage velocity $V_i$ is stored in the memory means 16.

The rope tension Ti in each main rope is computed by the rope tension computing means 13 based on the traveling-wave passage velocity $V_i$ from equation (4).

$$T_i = \gamma_r v_i^2 \tag{4}$$

where $\gamma_r$ is the weight per unit length of the main rope 1.

The rope tension $T_i$ thus computed is stored in the memory means 16.

The elevator constant values $l_r$ and $\gamma_r$ in the above equations are beforehand input by the elevator constant value input means 15 and stored in the memory means 16, and used in the computation by the rope tension computing means 13. Rather than using the traveling wave detector means 9, a technician may measure the traveling-wave return time $t_1$ using a watch and manually enter it through the elevator constant value input means 15 to compute rope tension.

The rope tension $T_i$ thus determined and stored in the memory means 16 is output through the output means 17.

To output the content in the memory means 16 to an external personal computer, memory device or output device, the data input/output interface 19 is used to transfer data.

The portable measuring device 20 contains the power supply means (battery) 18 that supplies power to the traveling wave detector means 9, detected signal amplifier means 10, signal filter means 11, traveling-wave passage velocity computing means 12, rope tension computing means 13, elevator constant value input means 15, memory means 16, output means 17 and data input/output interface 19. The portable measuring device 20 thus provides an excellent portability, and enhances the efficiency of the measurement operation.

Embodiment 2

The embodiment 2 of the present invention is now discussed.

The elevator rope tension measuring apparatus of the embodiment 2 is identical to the one of the embodiment 1 except that the portable measuring device 20 in FIG. 2 in the embodiment 2 comprises additionally the spring adjustment quantity computing means 14 instead of the rope tension computing means 13 that determines rope tension.

Specifically, in the portable measuring device 20, the traveling-wave passage velocity computing means 12 is used as the traveling-wave return time computing means for computing the traveling-wave return time as the traveling-wave passage information, and the spring adjustment quantity computing means 14 is used to compute, based on the traveling-wave return time, the adjustment quantity for the main rope tension adjusting nut 7 that tightens the main rope tension adjusting shackle spring 6.

The operation of the embodiment 2 is now discussed.

In the embodiment 1, the rope tension computing means 13 determines rope tension, which is then output by the output means 17. An output result that is required to perform rope check and adjustment operation is an adjustment quantity $\Delta x_i$ for the main rope tension adjusting nut 7 rather than rope tension itself. The main rope tension adjusting nut 7 cannot be adjusted with the knowledge of a rope tension value. All main ropes 1 are measured for passage velocity time or traveling-wave return time $t_1$. Based on the traveling-wave return time $t_i$ from the traveling-wave passage velocity computing means 12, the spring adjustment quantity computing means 14 computes the adjustment quantity for the main rope tension adjusting nut 7 that tightens the main rope tension adjusting shackle spring 6 using equation (5). To determine the adjustment quantity for the main rope tension adjusting nut 7, rope tension $T_i$ is not required.

$$\begin{Bmatrix} \Delta x_1 \\ \cdot \\ \cdot \\ \cdot \\ \Delta x_n \end{Bmatrix} = \frac{4l_r^2 \gamma_r}{k_{rs}} \begin{Bmatrix} \xi_r - \frac{1}{t_1^2} \\ \cdot \\ \cdot \\ \cdot \\ \xi_r - \frac{1}{t_n^2} \end{Bmatrix} \tag{5}$$

where $\xi_r$ is determined by summing the reciprocals of the squares of the return times $t_1$ of the traveling waves of n ropes and by dividing the sum by n, based on the measurements, and is thus expressed by equation (6), $$\xi_r = \frac{1}{n} \sum_{i=1}^{n} \frac{1}{t_i^2} \tag{6}$$

$k_{rs}$ is a spring constant that is determined by serially coupling the spring constant $k_s$ of the main rope tension adjusting shackle spring 6 and the spring constant $k_r$ of the main rope 1 of $l_r$ long, expressed by equation (7). The spring constant $k_r$ of the main rope 1 of $l_r$ long is given by equation (8).

$$k_{rs} = \frac{k_s k_r}{k_s + k_r} \quad (7)$$

$$k_r = \frac{EA}{l_r} \quad (8)$$

where E is the longitudinal modulus of the main rope 1 and A is the cross-sectional area of the main rope 1.

The adjustment quantity $\Delta x_i$ of the main rope tension adjusting nut 7 thus computed is stored in the memory means 16.

The elevator constant values n, $l_r$, $k_s$, E and A used in the above equations are input through the elevator constant value input means 15, stored in the memory means 16, and used by the spring adjustment quantity computing means 14. Rather than using the traveling wave detector means 9, a technician may measure the traveling-wave return time $t_i$ using a watch and manually enter it through the elevator constant value input means 15.

The adjustment quantity $\Delta x_i$ of the main rope tension adjusting nut 7 thus computed and stored in the memory means 16 is displayed by the output means 17. To output the content in the memory means 16 to an external personal computer, memory device or output device, the data input/output interface 19 is used to transfer data.

The technician adjusts the main rope tension adjusting nut 7 based on the adjustment quantity of the main rope tension adjusting nut 7 displayed by the output means 17, and adjusts uniformly all main ropes 1. Although the above discussion focuses on the car-side main ropes 1a, the same is true of the counterweight-side main ropes 1b. In succession to the tension adjustment of the car-side main ropes 1a, the counterweight-side main ropes 1b are adjusted. When tension adjustment on the main rope 1 on the car 2 and counterweight 4 is fully completed, the entire adjustment is completed. Measurement is again optionally performed as necessary for verification.

When adjustment is performed on the car-side main ropes 1a and counterweight-side main ropes 1b as described above, the stop position of the elevator car 2 for measurement and adjustment is not limited to a particular position. In a simpler way, the elevator car 2 may be stopped at the lowest floor with the rope length set to be maximum, and the car-side main ropes 1a only are measured and adjusted.

Embodiment 3

In the embodiment 3, the rope horizontal (transverse) acceleration is measured using an acceleration sensor that is one of the acceleration detector means, as the traveling wave detector means 9 shown in FIGS. 1A and 1B.

FIG. 8 shows one example of the waveform of the traveling wave measured using the acceleration sensor.

From the above discussion of the principle of generation of traveling wave, the traveling waves give rise to a large impulsive amplitude in the direction perpendicular to the main rope each time the traveling waves perform a full return travel along the main rope. The passage of the traveling wave is clearly detected as shown in FIG. 8 by using the acceleration sensor that is one of the acceleration detector means, as the traveling wave detector means 9.

Embodiment 4

Figure 10:
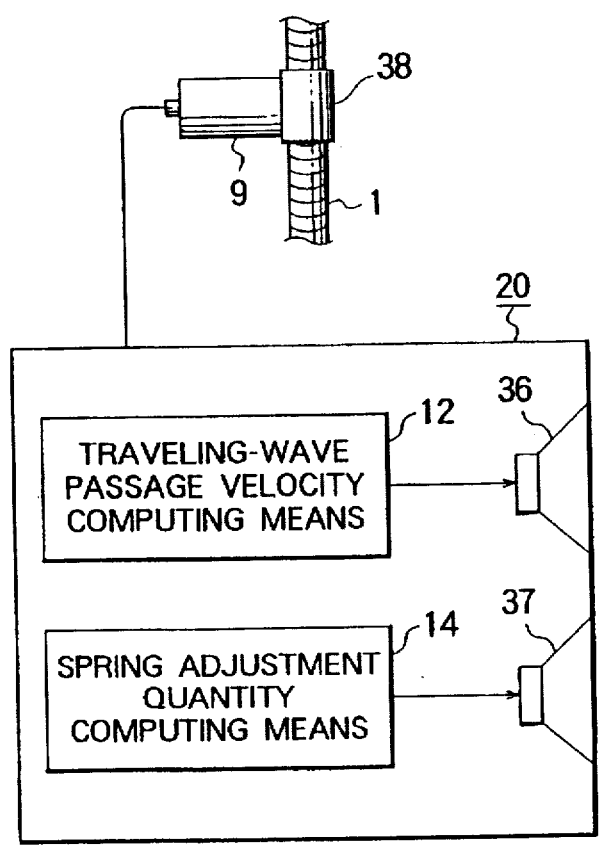
FIG. 10 is a block diagram showing the internal arrangement of the portable measuring device in an embodiment 4 of the present invention.

As shown in FIG. 10, in the embodiment 4, the portable measuring device 20 in FIG. 2 further comprises traveling-wave passage notification means 36 for informing of the pass of the traveling wave with a sound based on the output from the traveling-wave passage velocity computing means 12 as the traveling-wave passage information computing means, and alarm sound generator means 37 for sounding an alarm when a set level is exceeded by the adjustment quantity for the main rope tension adjusting nut 7 which is computed by the spring adjustment quantity computing means 14 as the adjustment quantity computing means and stored in the memory means 16 based on the judgment that adjustment is considered as necessary.

The operation of the embodiment 4 is now discussed.

The check and adjustment are performed in a narrow space and under insufficient lighting conditions above the top of the car. To perform efficiently the check and adjustment under such conditions, audio output is a useful indication in the procedure. In addition to the functions in embodiments 1 and 2, the rope tension computing means 13 outputs a signal indicative of a passage of the traveling wave. The traveling-wave passage notification means 36 connected to the rope tension computing means 13 gives off an audio output to notify the technician of the passage of the traveling wave in an assured manner. The technician can thus determine the completion of the measurement. In connection with the adjustment quantity for the main rope tension adjusting nut 7 computed by the spring adjustment quantity computing means 14 and stored in the memory means 16, if the spring adjustment quantity for rope tension as a result of computation in succession to the measurement of a plurality of main ropes exceeds a target range set, the alarm sound generator means 37 gives off an alarm sound. Thus, the efficiency of the check and adjustment is enhanced.

Embodiment 5

Figure 11:
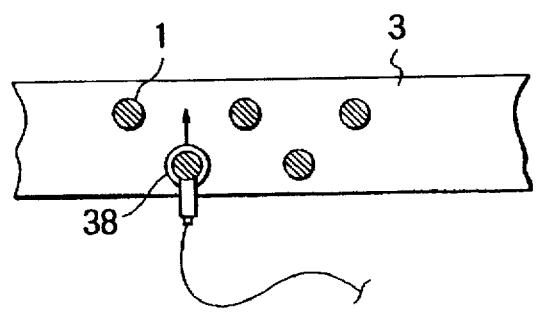
FIG. 11 is a top view showing the mounting section of the traveling wave detector means in an embodiment 5 of the present invention.
Figure 12:
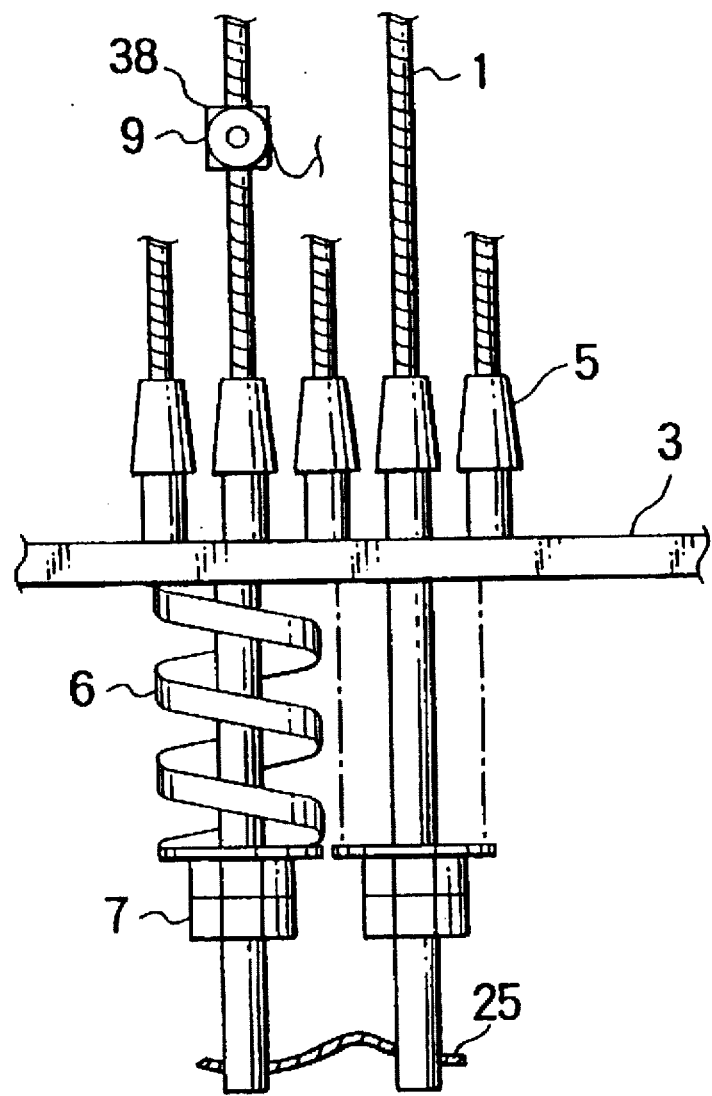
FIG. 12 is a front view showing the mounting section of the traveling wave detector means in the embodiment 5 of the present invention.

The embodiment 5 of the present invention is now discussed referring to FIGS. 11 and 12.

FIG. 12 shows a main rope anti-rotation wire 25 for preventing the main rope 1 from untwisting when the main rope tension adjusting nut 7 is rotated and a mounting band 38 for mounting the traveling wave detector means 9 onto the main rope 1 in the direction perpendicular to the plane of the parallel arrangement of a plurality of main ropes.

In embodiments 1 and 2, the orientation of the traveling wave detector means 9 mounted on the main rope 1 and the direction of the application of displacement are not specified. With a plurality of main ropes 1 attached to the car frame 3, the main ropes 1 are arranged very closely. When a displacement is exerted to one main rope 1, this hits the next main rope 1. In addition the displacement applied, other disturbance oscillations are added, degrading measurement accuracy of the traveling wave detector means 9.

In FIGS. 11 and 12, to prevent such hitting between adjacent ropes, the direction of application of displacement is set to be at a right angle to the plane of the parallel arrangement of the plurality of main ropes. The traveling wave detector means 9 is mounted using the mounting band 38 at a right angle to the plane of the parallel arrangement of the main ropes. The mutual rope hitting and degradation of measurement accuracy are thus prevented. The mounting band 38 facilitates the mounting of the traveling wave detector means 9 resulting in an improved measurement efficiency. The untwisting of the main rope 1 is controlled by the main rope anti-rotation wire 25.

Embodiment 6

The embodiment 6 is now discussed referring to FIGS. 13A through 13D.

FIGS. 13A through 13D show examples of the response with time in the acceleration waveform of the traveling wave occurring in the main rope 1, and waveforms resulting from the power spectrum, auto-correlation function and cepstrum processes.

Figure 13A:
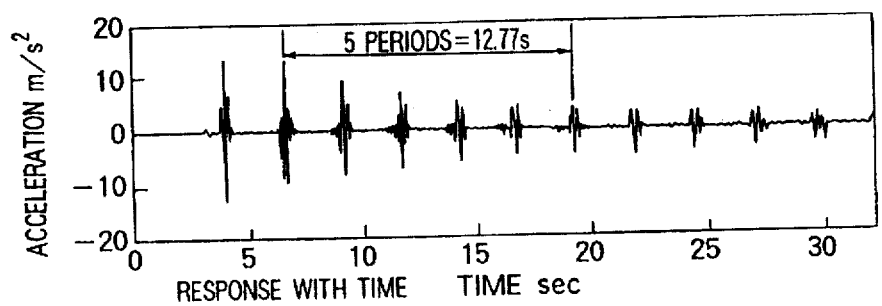
FIGS. 13A through 13D show examples of the response with time in the acceleration waveform of the traveling wave occurring in the main rope 1, and waveforms resulting from power spectrum, auto-correlation function and cepstrum processes according to an embodiment 6 of the present invention.

A maximum acceleration peak search method is used as one of the velocity computing methods in the traveling-wave passage information computing means in embodiments 1 and 2. The maximum acceleration peak search method computes the time of a maximum amplitude acceleration that instantaneously occurs each time the traveling wave makes one full return travel along the main rope 1, referring to the response with time of the traveling-wave acceleration waveform of FIG. 13A. From the time intervals of the maximum acceleration, the return time of the traveling wave is determined, and the velocity of the traveling wave is computed from equation (3). The return times are measured for a plurality of times to improve measurement accuracy level. In FIG. 13A, five return travels take t5=12.77 seconds.

Also, a power spectrum computing method using the FFT (fast Fourier transform) is used as a estimation method for the traveling-wave return time.

Figure 13B:
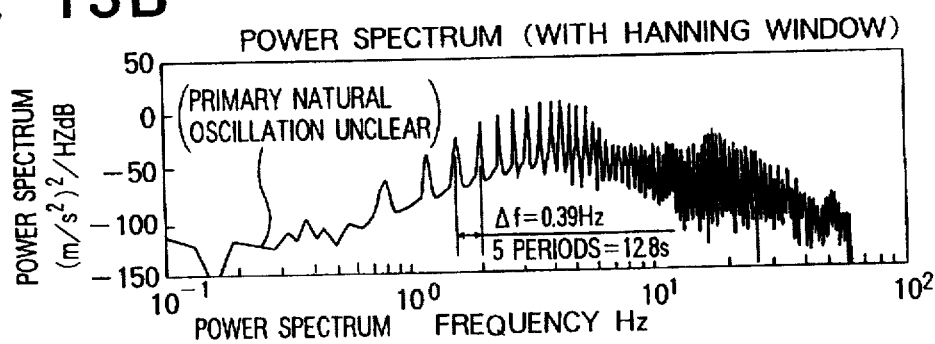

The waveform with time in FIG. 13A is converted into frequency domain using FFT computation, and the waveform in FIG. 13B results. The interval of peak values $\Delta f=0.39$ Hz is read out from the power spectrum. Its reciprocal is one return time $T=1/\Delta f=2.56$ seconds. If multiplied by 5, five return travels of t5=12.82 seconds result.

Also, an auto-correlation function computing method is used as a estimation method for the traveling-wave return time.

Figure 13C:
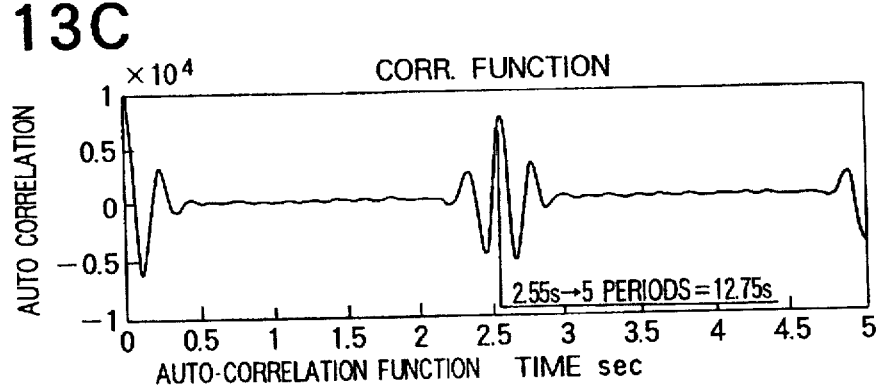

The waveform with time in FIG. 13A is subjected to auto-correlation function computation, and an auto-correlation function waveform in FIG. 13C results. The auto-correlation function indicates the basic time component included in the original time waveform. The highest peak value in FIG. 13C is read as t=2.55 seconds. If multiplied by 5, five return travels of t5=12.75 seconds result.

Figure 13D:
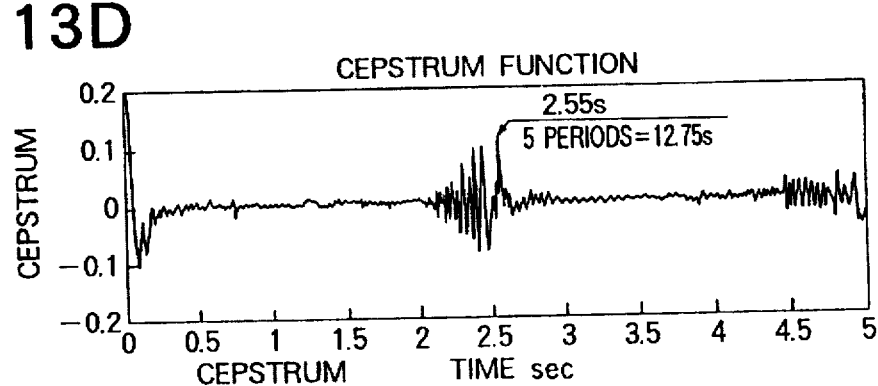

Like the auto-correlation function computing method, a cepstrum computing method in FIG. 13D indicates the basic time component contained in the original time waveform. The highest peak value in FIG. 13D is read as t=2.55 seconds. If multiplied by 5, five return travels of t5=12.75 seconds result.

The return time of the traveling wave is thus estimated with a good accuracy using these computing methods. Even if rope hitting takes place or the generation of the traveling wave is not very successful because of inappropriate application of displacement, the auto-correlation computing method in FIG. 13C and the cepstrum computing method in FIG. 13D can extract the basic time component contained in the time waveform.

In view of this, these estimation methods are preferably used in traveling-wave return time estimation means 13. Computation time taken is increasing in the order of the processes in FIGS. 13A, 13B, 13C, and 13D. To perform the auto-correlation function process in FIG. 13C and the cepstrum process in FIG. 13D, a traveling-wave return time estimation means 13 needs a high-speed processing capability, pushing up the cost of the apparatus. If the apparatus is dictated by a cost consideration, the maximum acceleration peak search method in FIG. 13A is used to estimate the traveling-wave return time, though disturbance immunity is slightly lowered. By utilizing one of these signal processing methods according to the processing capability of the traveling-wave return time estimation means 13, a cost effective portable measuring device 20 is provided and a high-accuracy traveling-wave return time is estimated. Each process of the above computing methods is a known one and its detailed algorithm is not discussed herein.

Embodiment 7

Figure 14A:
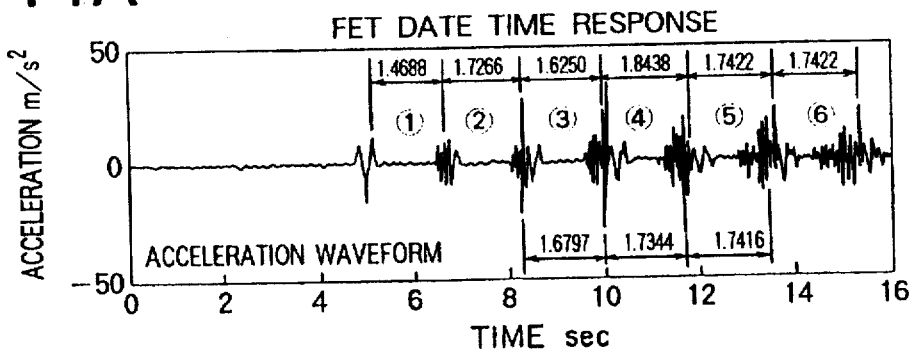
FIGS. 14A through 14C show examples of the response with time, acceleration waveform, velocity waveform, and position waveform of the traveling wave occurring in the main rope 1 according to an embodiment 7 of the present invention.
Figure 14B:
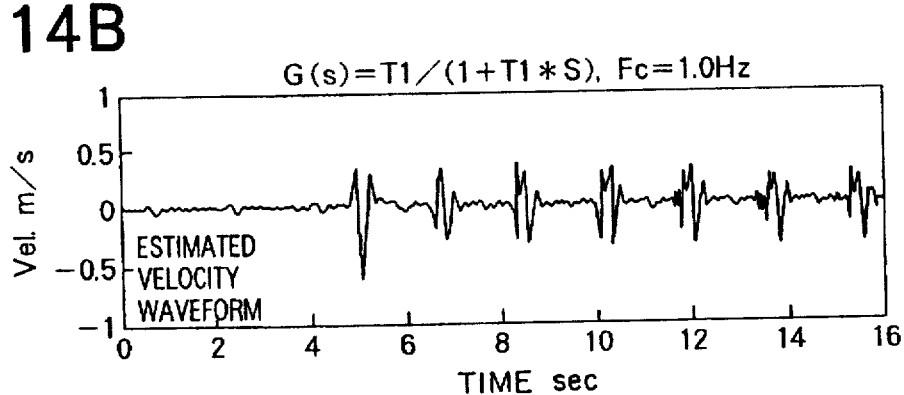
Figure 14C:
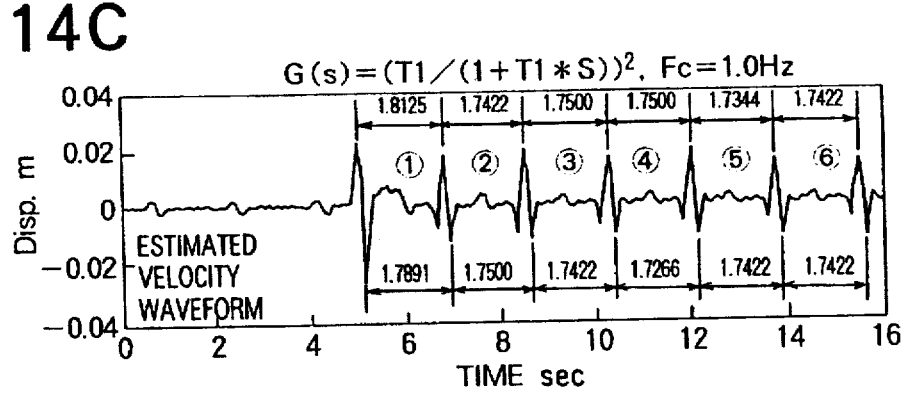

The embodiment 7 of the present invention is now discussed referring to FIGS. 14A through 14C.

FIGS. 14A through 14C shows the acceleration waveform, velocity waveform, and position waveform with time, respectively, in connection with the traveling wave generated in the main rope 1.

Depending on the type of the elevator and the manner in which a displacement is applied, the acceleration waveform can be the one as shown in FIG. 14A, where its acceleration peak value is difficult to read, unlike the acceleration waveform in FIG. 8. If, in such a case, the maximum acceleration peak search method described above is used as it is, measurement accuracy is degraded.

When the peak value of the acceleration waveform is difficult to read, the signal filter means 11 is used to reduce the noise of the detected signal. In the signal filter means 11 in FIG. 2, an integrator is constructed of a primary low-pass filter G(s) to integrate the acceleration waveform. By integrating the acceleration waveform once, an estimated velocity waveform results as shown in FIG. 14B, and by integrating twice, an estimated position waveform results as shown in FIG. 14C. These waveforms facilitate the search of the peak value.

Embodiment 8

In the embodiment 2, the length of the main rope 1, (the distance between the car 2 and the hoist rope pulley 21) at the measurement is used to determine the adjustment quantity $\Delta x_i$ for the main rope tension adjusting nut 7 as expressed in equations (3) and (6). To measure at an arbitrary floor, measuring the rope length on the top of the car 2 at the arbitrary floor is difficult and impractical. Since the square of the main rope length $l_r$ is used in the computation of the adjustment quantity $\Delta x_i$ for the main rope tension adjusting nut 7 as understood from equation (3), the effect of errors is great. Let $m_c$ represent the weight of the car 2, $\gamma_r$ the weight per unit length of the main rope 1, $t_i$ the traveling-wave return time measured, and g the acceleration of gravity, the main rope length $l_r$ at the measurement is given by the following equation (9).

$$l_r = \sqrt{\frac{m_c g}{4\gamma_r \sum_{i=1}^{n} \frac{1}{t_i^2}}} \quad (9)$$

Figure 24A:
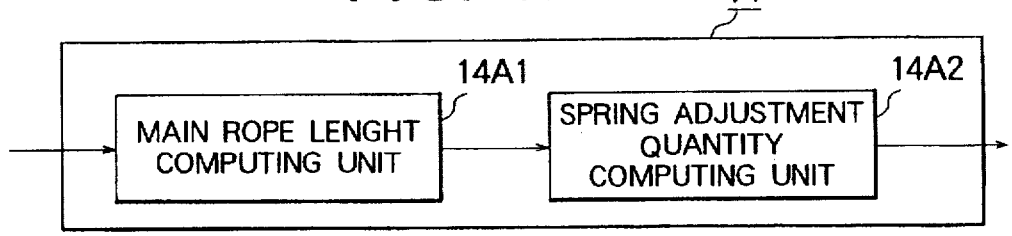
FIGS. 24A through 24D are block diagrams showing the construction of the spring adjustment quantity computing means according to the embodiments 8 through 11 of the present invention.

As shown in FIG. 24A, the spring adjustment quantity computing means 14 comprises a main rope length computing unit 14A1 for computing the length of the main rope at an arbitrary position of measurement based on the overall weight of the car, and a spring adjustment quantity computing unit 14A2 for computing the adjustment quantity for the rope tension adjusting spring of the main rope based on the computed length of the main rope. The spring adjustment quantity computing means 14 is thus capable of performing the computation expressed in equation (9). The main rope length $l_r$ at an arbitrary position is derived based on the overall weight of the car By substituting equation (9) into equations (5) and (8), the adjustment quantity $\Delta x_i$ for the main rope tension adjusting nut 7 is computed without using the main rope length value $l_r$. In equation (5) in which equation (9) is substituted, the effect of an error in the weight $m_c$ of the car 2 is linear rather than squared. In contrast to the previous case where the square of the main rope length $l_r$ is factored, the effect of errors is lowered. Strictly, the weight $m_c$ of the car 2 should be the overall weight inclusive of half the weight of the car-side main rope and the weight of passengers. However, the effect of errors is small, and the adjustment quantity $\Delta x_i$ for the main rope tension adjusting nut 7 can be computed if the car overall weights at the lowest floor and at an intermediate level are beforehand known. To compute the adjustment quantity $\Delta x_i$ for the main rope tension adjusting nut 7 at an arbitrary floor, the weight $m_c$ of the car 2 is preferably used.

Embodiment 9

Figure 15:
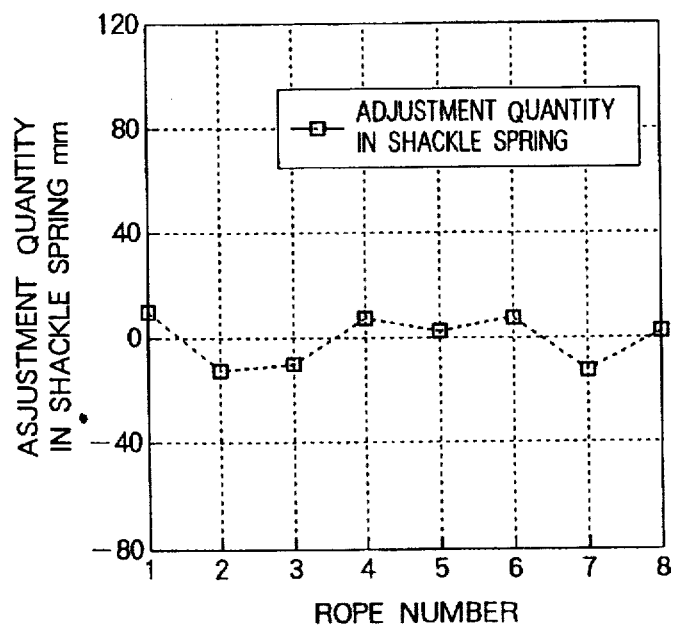
FIG. 15 shows an example of computing the adjustment quantity for a main rope tension adjusting nut 7 according to an embodiment 9 of the present invention.
Figure 16:
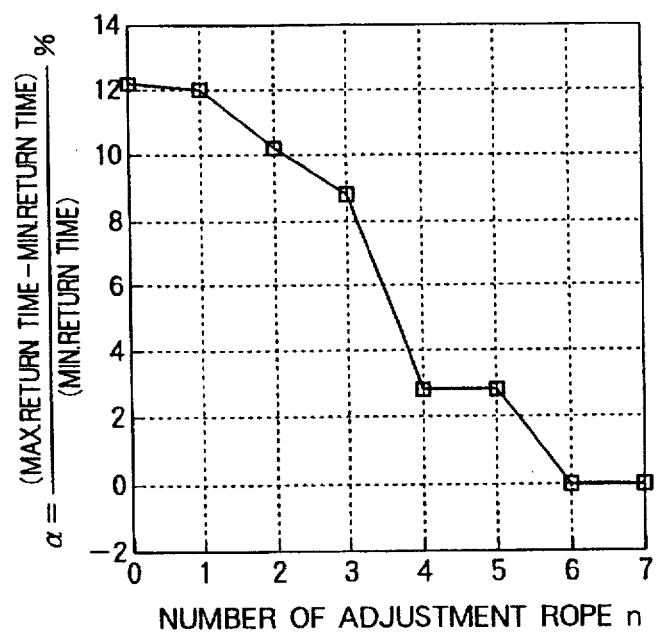
FIG. 16 shows variations in tension with the number of ropes changed in the embodiment 9 of the present invention.

The embodiment 9 of the present invention is now discussed referring to FIGS. 15 and 16.

FIG. 15 shows an example of computation of the adjustment quantity $\Delta x_i$ for the main rope tension adjusting nut 7. FIG. 16 shows variations in tension with the number of ropes changed, based on the computation of FIG. 15.

According to the present invention, equation (3) determines the adjustment quantity $\Delta x_i$ for the main rope tension adjusting nut 7 for each of the eight main ropes as shown in FIG. 15. If all main rope tension adjusting nuts 7 are adjusted to their respective computed adjustment quantities $\Delta x_i$, tension of all main ropes 1 becomes uniform. Rope adjustment takes a few minutes per rope, and adjusting all main rope tension adjusting nuts 7 is a time-consuming job.

If how many ropes should be adjusted to control what degree of variation is known, the spring adjustment quantity which keeps the number of ropes to be adjusted to be as low as possible within a target adjustment variation range can be specified.

When a given main rope tension adjusting nut 7 only is fully adjusted up to its computed adjustment quantity $\Delta x_i$, the variation of the main rope tension is represented by the return time. The return time $t_{i\_new}$ after adjustment is given by the following equation (10), where $T_{i\_new}$ represents the rope tension of the given main rope when it is fully adjusted up to its computed adjustment quantity $\Delta x_i$. $T_{i\_new}$ is given by the following equation (11).

$$t_{i\_new} = 2l_r \sqrt{\frac{\gamma_r}{T_{i\_new}}} \quad (10)$$

$$T_{i\_new} = k_{rs} \left\{ \frac{m_c g - k_{rs} \sum_{i=1}^{n} (\Delta x_i + x_i)}{n k_{rs}} + (\Delta x_i + x_i) \right\} \quad (11)$$

where $x_i$ is the adjusted value of the main rope tension adjusting nut 7. As for the rope in which its main rope tension adjusting nut 7 is fully adjusted to its computed adjustment quantity $\Delta x_i$, $(\Delta x_i + x_i) = 0$. As for other ropes with their main rope tension adjusting nuts 7 unadjusted, $(\Delta x_i + x_i) = x_i$.

When the main ropes in FIG. 15 are adjusted in the order of magnitude of absolute values of adjustment quantities, an assessment value $\alpha$ of variation based on the maximum and minimum values of traveling-wave return times in all main ropes is given as follows:

$\alpha$=(max. return time−min. return time)/(min. return time) ×100[%]  (12)

FIG. 16 plots the change of the result given by equation (12) with the result from equation (12) represented by the ordinate and the number of adjusted ropes represented by the abscissa. As seen from FIG. 16, four main rope tension adjusting nuts 7 should be adjusted to control the value of $\alpha$ to within 4%.

Figure 24B:
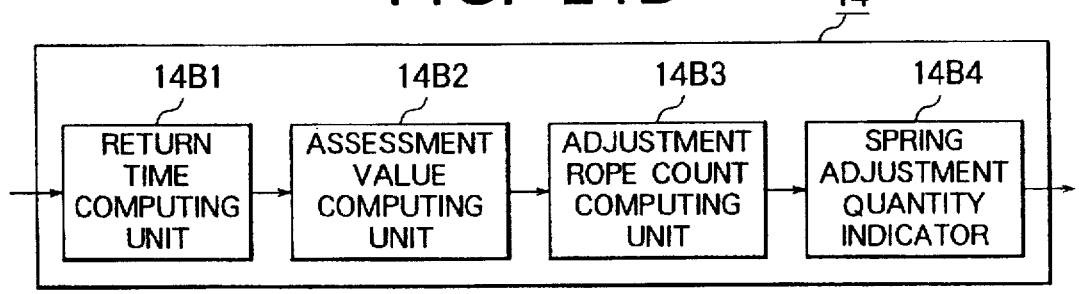
Figure 24C:
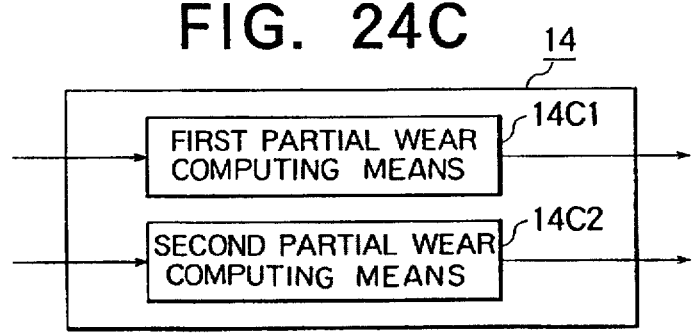

As shown in FIG. 24B, the spring adjustment quantity computing means 14 comprises a return time computing unit 14B1 for computing the traveling-wave return time for all main ropes if adjusted to the computed spring adjustment quantities, an assessment computing unit 14B2 for computing the assessment value of variation based on the maximum and minimum values the return times, an adjustment rope count computing unit 14B3 for computing the number of adjustment ropes to be adjusted, the computed assessment value of which falls within a target adjustment range in need of adjustment, and a spring adjustment quantity indicator 14B4 for indicating the spring adjustment quantities of the adjustment ropes to be adjusted in the order of magnitude of absolute values of the adjustment quantities. With computing capabilities indicated by equations (10), (11) and (12), the spring adjustment quantity computing means 14 uses the value of $\alpha$ as a reference, determines the number of ropes or rope count to be adjusted, the $\alpha$ value of which falls within the target adjustment range in need of adjustment, indicates the spring adjustment quantities of the ropes to adjusted in the order of magnitude of the absolute values of the spring adjustment quantities, and thereby reduces the adjustment operation time for the main rope tension adjusting nut 7.

Embodiment 10

Figure 17:
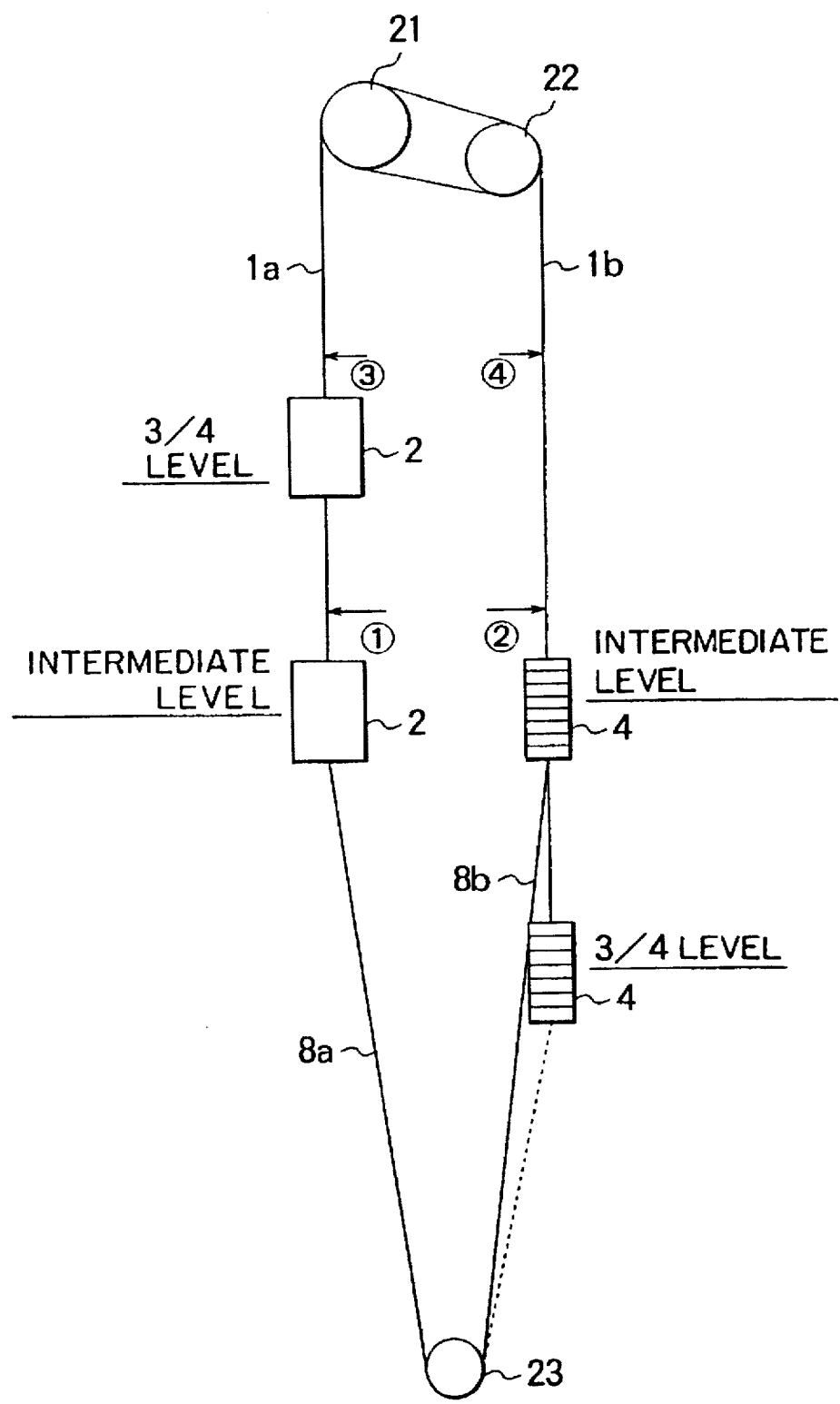
FIG. 17 is a vertical cross-sectional view showing points of tension measurements in the entire elevator system according to an embodiment 10 of the present invention.
Figure 18:
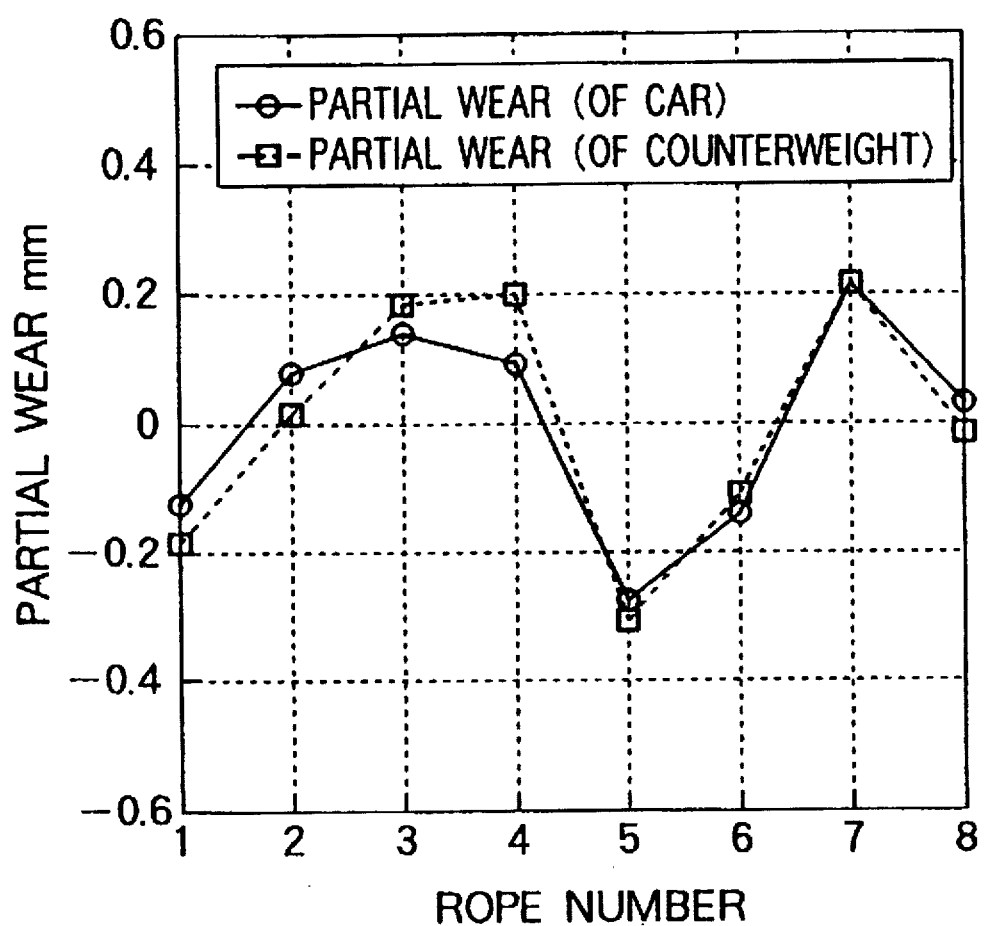
FIG. 18 shows an example of measurements of partial wear in the sheave groove in the elevator in the embodiment 10 of the present invention.

The embodiment 10 of the present invention is now discussed referring to FIGS. 17 and 18.

In FIG. 17, when the main rope 1 is kept under an inappropriate tension for a long period of time, the hoist rope pulley 21 and the groove of the guide sheave 22 occasionally suffer a partial wear. Once a partial wear takes place in the sheaves, the rope paid out suffers difference in length, particularly in a long vertical travel in a tall hoistway, and the unbalance in rope tension worsens. Such irregularities are noticeable with the length of the vertical travel.

When checking tension of the main rope 1, the partial wear of the sheave groove may need checking as well. To this end, the elevator car 2 is stopped at an intermediate level 1/2 between the first and second floors and another intermediate level 3/4 between the third and fourth floors to measure tension on the car-side main rope 1a at the positions denoted by numbers 1 and 3 circled, as shown in FIG. 17. Similarly, tension is measured on the counterweight-side rope 1b at the positions denoted by numbers 4 and 2 circled.

In the measurement results, let $\Delta x_{1/2c} = (\Delta x_1, \ldots, \Delta x_n)^t_{1/2c}$ represent the adjustment quantity for the car-side main rope tension adjusting nut 7a at the intermediate level 1/2, $\Delta x_{3/4c} = (\Delta x_1, \ldots, \Delta x_n)^t_{3/4c}$, the adjustment quantity for the car-side main rope tension adjusting nut 7a at the intermediate level 3/4, $\Delta x_{1/2w} = (\Delta x_1, \ldots, \Delta x_n)^t_{1/2w}$, the adjustment quantity for the counterweight-side main rope tension adjusting nut 7b at the intermediate level 1/2, $\Delta x_{3/4w} = (\Delta x_1, \ldots, \Delta x_n)^t_{3/4w}$, the adjustment quantity for the counterweight-side main rope tension adjusting nut 7b at the intermediate level 3/4. The superscript letter t represents the transpose of each vector. Let $\Delta r_c$ represent a partial wear amount of the sheave groove determined from the adjustment quantity for the car-side main rope tension adjusting nut 7a, and $\Delta r_w$ represent a partial wear amount of the sheave groove determined from the adjustment quantity for the counterweight-side main rope tension adjusting nut 7b.

The partial wear amounts of the sheave groove are determined from the following equations (13) and (14).

$$\Delta r_C = \frac{R}{l_m} (\Delta x_{1/2C} - \Delta x_{3/4C}) \quad (13)$$

$$\Delta r_W = \frac{R}{l_m} (\Delta x_{3/4W} - \Delta x_{1/2W}) \quad (14)$$

where R is the sheave equivalent radius for the hoist rope pulley 21 and the guide sheave 22, and 1 m is the distance of travel from the intermediate level 1/2 to the intermediate level 3/4. By the partial wear amount of the sheave groove is meant the sum of partial wear of the hoist rope pulley 21 and the guide sheave 22, and partial wear amounts $\Delta r_c$ and $\Delta r_w$ are ideally equal.

The spring adjustment quantity computing means 14 features the computing capabilities expressed by equations (13) and (14). FIG. 18 plots the partial wear amounts of the sheave determined by the spring adjustment quantity computing means 14. As can be seen from FIG. 18, partial wear amounts $\Delta r_c$ and $\Delta r_w$ approximately agree with each other. The partial wear amount is 0.2 mm at maximum. Referring to this level of partial wear, the assessment criteria for the hoist rope pulley 21 and the guide sheave 22 are established, allowing elevator service quality to be maintained at a high standard.

Specifically, the spring adjustment quantity computing means 14 thus comprises first and second partial wear computing means 14C1 and 14C2, each for computing a partial wear of the sheave of the hoist rope pulley that hoists the main rope by wrapping, according to the difference between the spring adjustment quantities of springs of the car side and the counterweight side measured at different points of measurement along the main rope, and the output means 17 outputs the computation result of these partial wear amounts. Thus, a high-standard elevator service quality is achieved in the elevator.

Embodiment 11

Figure 19A:
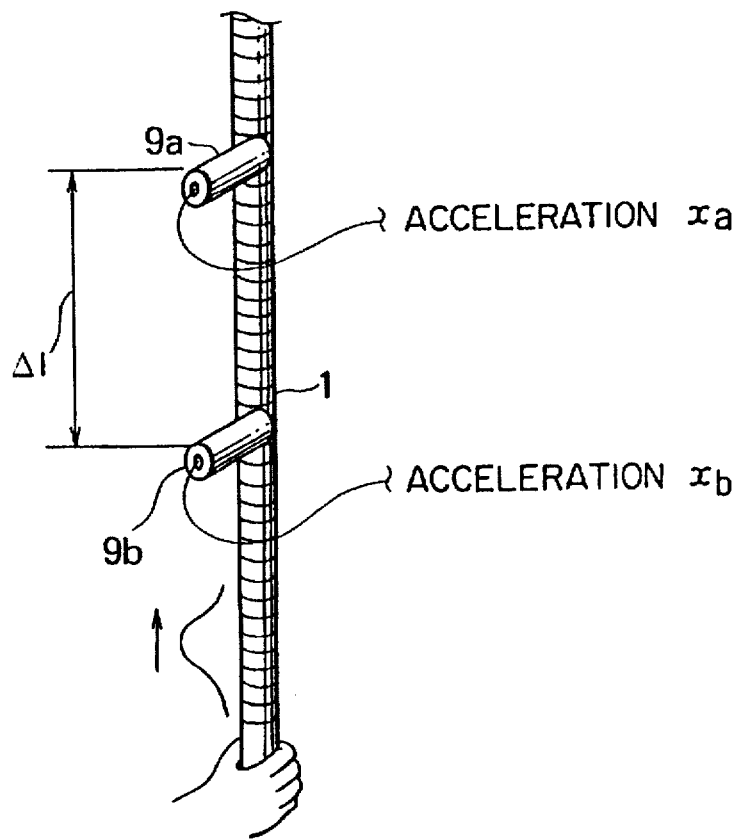
FIG. 19A is a diagrammatic view of an embodiment 11 of the present invention and FIG. 19B is an explanatory view of the embodiment 11.
Figure 19B:
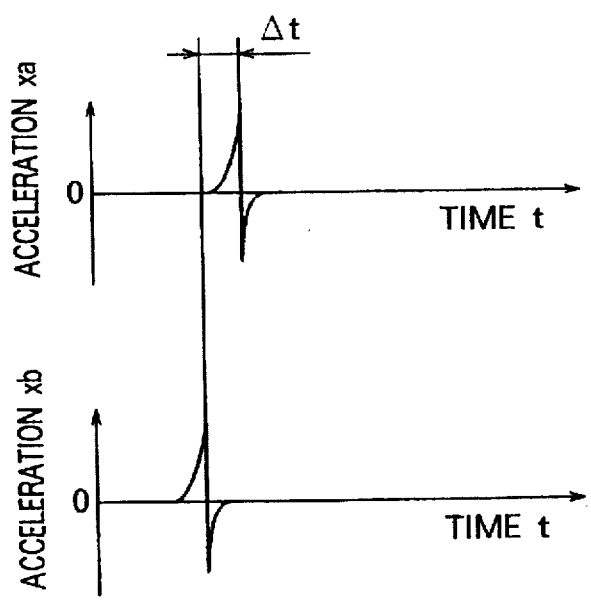

The embodiment 11 of the present invention is discussed referring to FIGS. 19A and 19B.

In embodiments 1, 2 and 8, either the main rope length or the overall car weight is required, as elevator constant values, in the computation of the adjustment quantity for the main rope tension adjusting nut 7. Occasionally, these values contains a slight degree of error. By attaching concurrently two traveling wave detector means 9 onto the main rope, the adjustment quantity for the main rope tension adjusting nut 7 can be computed without using these constant values.

As shown in FIG. 19A, two traveling wave detector means 9a and 9b are attached to the main rope 1 with a separation of $\Delta l$ allowed therebetween. A displacement is manually applied to the main rope 1. Traveling waves are generated on the main rope 1, and the maximum acceleration peak values are measured by these two traveling wave detector means 9a, 9b at the passage of the traveling waves. As shown in FIG. 19B, there is a difference between the passages of the traveling waves, and a delay time of $\Delta t$ seconds takes place between the occurrences of the peak values. The adjustment quantity $\Delta x_i$ for the main rope tension adjusting nut 7 is given by the following equation (15).

$$\begin{Bmatrix} \Delta x_1 \\ \cdot \\ \cdot \\ \cdot \\ \Delta x_n \end{Bmatrix} = \frac{\Delta l^2 \gamma_r}{k_{rs}} \begin{Bmatrix} \Delta \xi - \frac{1}{\Delta t_1^2} \\ \cdot \\ \cdot \\ \cdot \\ \Delta \xi - \frac{1}{\Delta t_n^2} \end{Bmatrix} \quad (15)$$

$$\Delta \xi = \frac{1}{n} \sum_{i=1}^{n} \frac{1}{\Delta t_i^2}$$

Figure 24D:
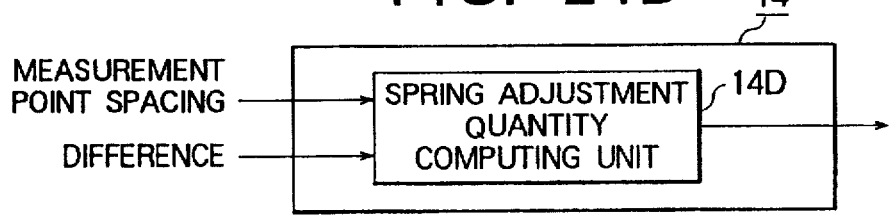

With the computing capability expressed by equation (15), the spring adjustment quantity computing means 14 computes the adjustment quantity for the main rope tension adjusting nut 7, performing a high-accuracy measurement with the adverse effect of error in elevator constant values reduced. As shown in FIG. 24D, the spring adjustment quantity computing means 14 comprises a spring adjustment quantity computing unit 14D for computing the adjustment quantity for the main rope tension adjusting spring based on an separation between different points of measurement along the main rope and a difference between passage times of the traveling waves at the points of measurement along the main rope. The spring adjustment quantity computing means 14 performs a high-accuracy measurement with the adverse effect of error in elevator constant values reduced.

Embodiment 12

Figure 20:
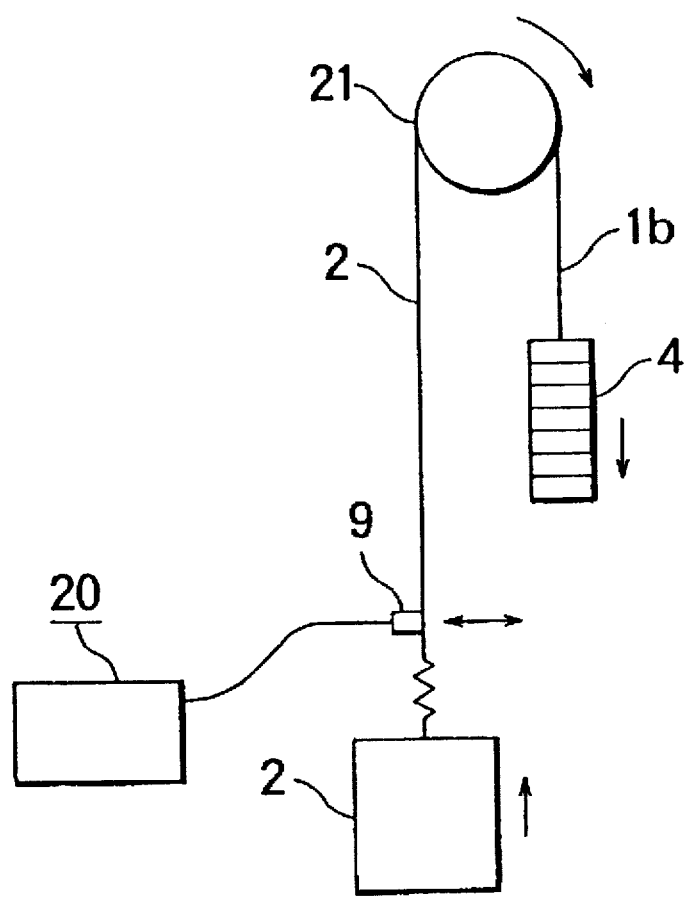
FIG. 20 is a front view of an embodiment 12 of the present invention.
Figure 21A:
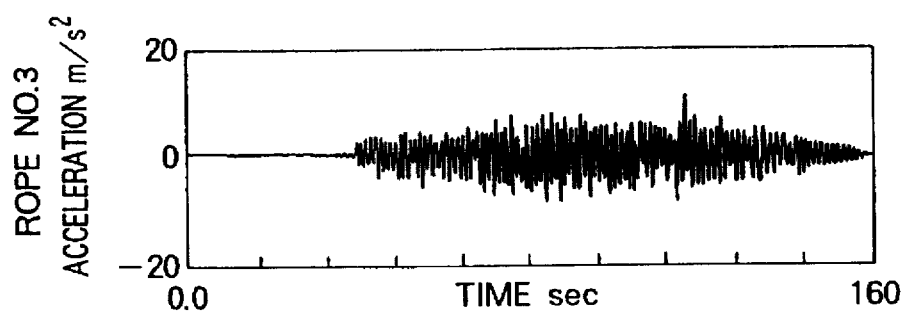
FIGS. 21A through 21C are waveform diagrams of horizontal acceleration in the rope in an example of the embodiment 12 of the present invention.
Figure 21B:
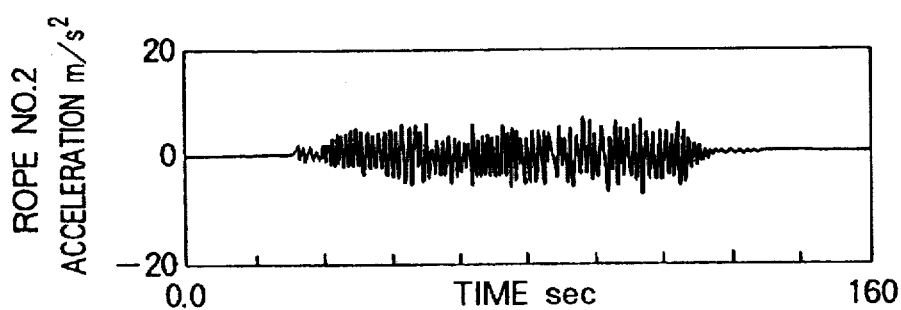
Figure 21C:
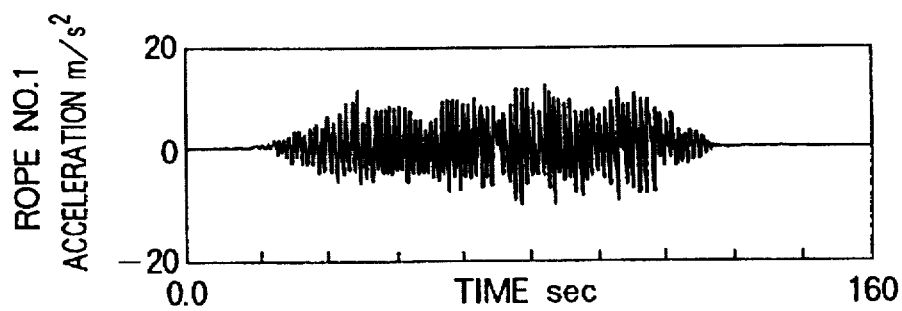

FIG. 20 is the block diagram showing the embodiment 12 of the present invention, in which components equivalent to those in FIG. 1 are designated with the same reference numerals, and their description is not repeated. FIGS. 21A through 21C shows measured acceleration waveforms of the oscillations taking place in three main ropes when the elevator is running.

In embodiment 1, the technician applies a displacement to the main rope 1 to generate a traveling wave. While the elevator is running, a random displacement is exerted to the hoist rope pulley 21 because of the irregular rotation of the motor that drives the hoist rope pulley 21 and the mechanical engagement between the main rope 1 and the hoist rope pulley 21. As a result, a large oscillation occurs in the main rope 1. By analyzing this rope oscillation, rope tension can be measured.

The waveforms in FIGS. 21A through 21C are horizontal accelerations of the main rope 1 on the car 2 when the elevator is raised. An acceleration of about 10 m/s2 occurs. The rope length shortens as the car 2 is raised, and the rate of shortening is common to all main ropes 1. These waveforms are subjected to one of the signal processing methods of the embodiment 6, and relative tensions are compared at a particular rope length to compute the adjustment quantity for the main rope tension adjusting nut 7.

Figure 25A:
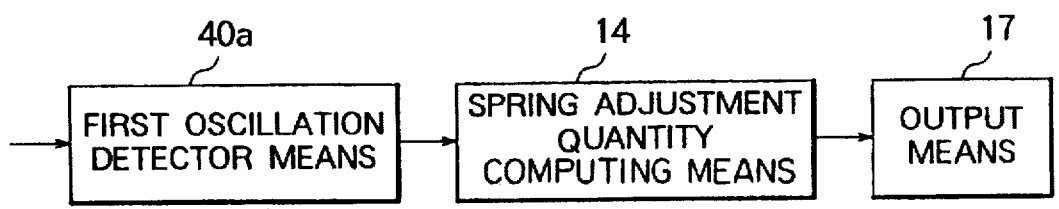
FIGS. 25A and 25B are block diagrams showing the construction of the elevator rope tension measuring apparatus according to the embodiments 12 and 13.

Specifically, in the same manner as in the embodiment 1 in FIG. 2, the rope tension measuring apparatus comprises, as shown in FIG. 25A, first oscillation detector means 40a that is an acceleration sensor for detecting the rope oscillation occurring in the main rope while the elevator runs, computing means 14 for computing the rope tension of the main rope or the adjustment quantity for the rope tension adjusting spring, based on the output from the first oscillation detector means 40a, and output means 17 for outputting the computation result from the computing means 14. The large oscillation occurring in the main rope is thus analyzed to measure the rope tension or the spring adjustment quantity.

Embodiment 13

Figure 22A:
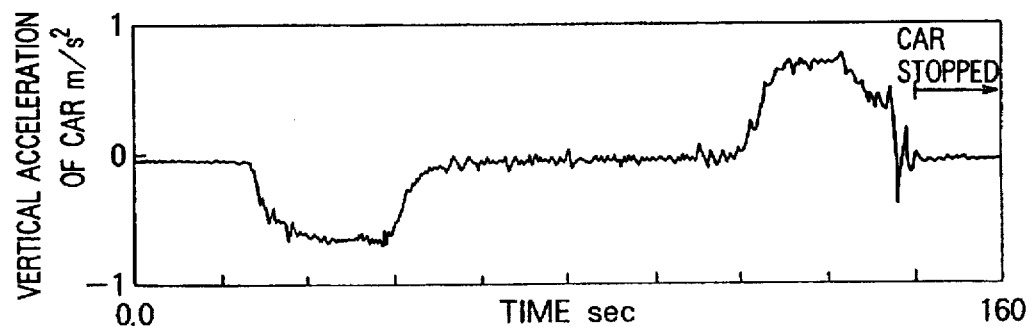
FIGS. 22A and 22B are waveform diagrams of vertical acceleration of the car and horizontal acceleration in the rope according to an embodiment 13 of the present invention.
Figure 22B:
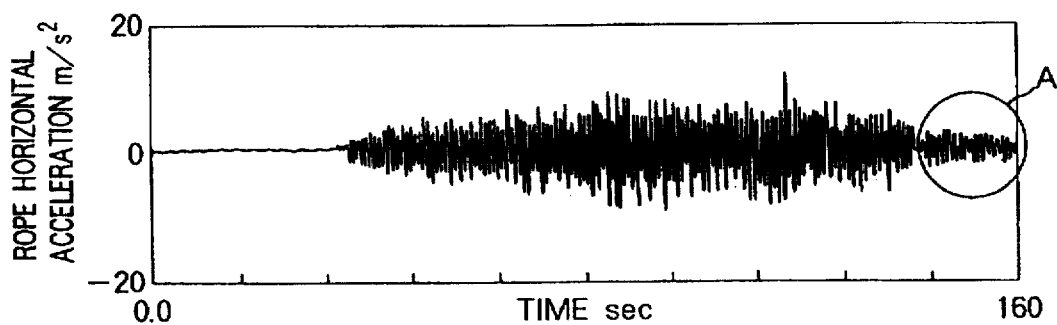
Figure 23:
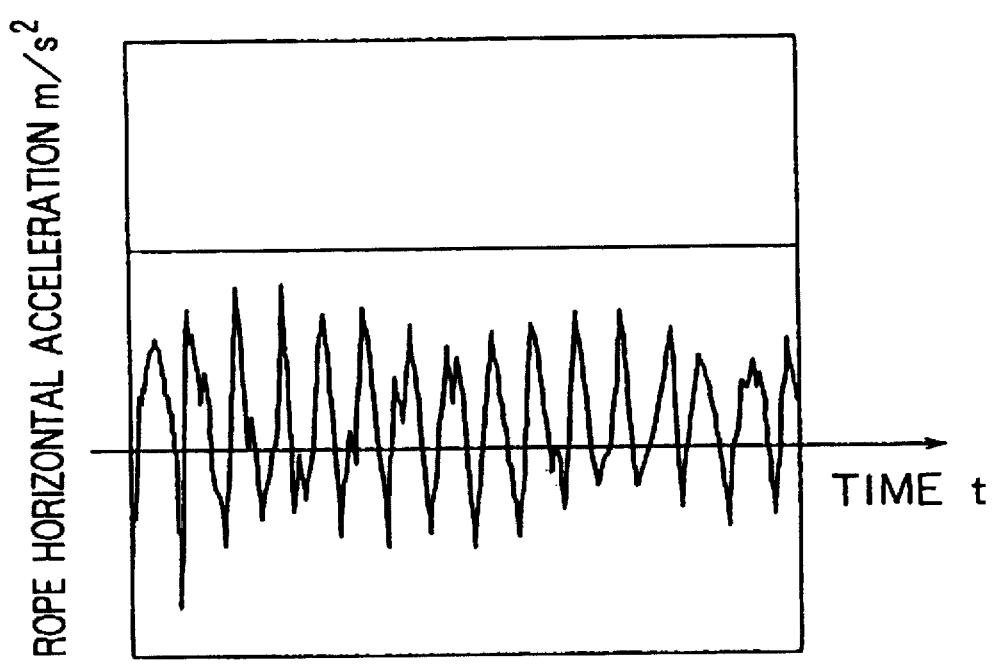
FIG. 23 is an enlarged view showing the rope horizontal acceleration waveform in the embodiment 13 of the present invention.

FIGS. 22A and 22B show measured vertical acceleration waveform of the car and horizontal acceleration waveform in the main rope 1 from the start to the stop of the elevator according to the embodiment 13. FIG. 23 is the enlarged view of the horizontal acceleration waveform denoted by the circle A in FIG. 22B.

In the preceding embodiment 12, rope tension is measured by analyzing the rope oscillation when the elevator is actually running. Rope tension can also be measured by measuring the horizontal acceleration in the main rope 1 when the car starts running from its stop state, or the residual horizontal acceleration in the main rope 1 in succession to the stop of the car from its running state.

Relative tensions are compared by subjecting the horizontal acceleration waveform residing in the main rope 1 in succession to the stop of the car 2 shown in FIG. 23 to one of the processing methods in the embodiment 6, and the adjustment quantity for the main rope tension adjusting nut 7 is thus computed.

Figure 25B:
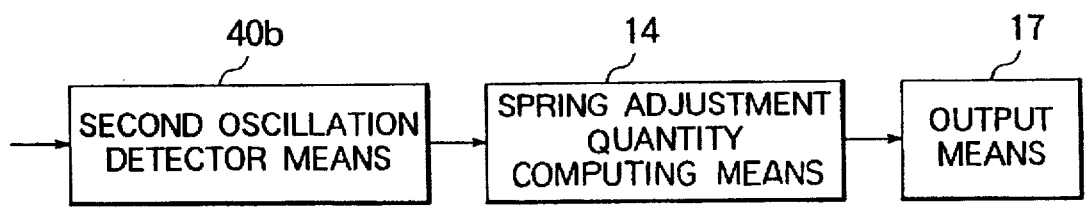

In the same manner as in the embodiment 1 in FIG. 2, the rope tension measuring apparatus comprises, as shown in FIG. 25B, second oscillation detector means 40b that is an acceleration sensor for detecting the rope oscillation occurring in the main rope when the elevator starts running from a stop state, or when the elevator stops running from a running state, computing means 14 for computing the rope tension of the main rope or the adjustment quantity for the rope tension adjusting spring, based on the output from the second oscillation detector means 40b and output means 17 for outputting the computation result from the computing means 14. The large oscillation occurring in the main rope is thus analyzed to measure the rope tension or the spring adjustment quantity.

Although each of the above embodiments is incorporated in a high-lift, 1:1 roping elevator in the above discussion, it equally works with the 2:1 roping elevator in FIG. 26, hydraulic elevators and low-lift elevators for tension check and adjustment.

As described above, the rope tension measuring apparatus for use with an elevator of the present invention of the type that measures the tension of a main rope that suspends a car and a counterweight, comprises travelling wave detector means for detecting a travelling wave occurring in the main rope in response to a displacement that is applied to the main rope, and a portable measuring device that computes and outputs an adjustment quantity in the rope tension based on the output from the travelling wave detector means. Thus, detecting the traveling wave, the rope tension measuring apparatus measures tension at a high-accuracy level even in a high-lift elevator.

As the travelling wave detector means, the acceleration detector means is employed to detect the condition of the pass of the travelling wave based on the detection of the maximum amplitude of the acceleration of the travelling wave that occurs in the horizontal direction of the main rope each time the travelling wave returns. The traveling wave occurring in the main rope is thus easily measured at a high gain and high-accuracy level. The acceleration detector means is constructed in a compact, light-weight sensor, which is easily mounted onto the main rope.

The rope tension measuring apparatus further comprises mounting means for mounting the travelling wave detector means in a direction perpendicular to the plane of the parallel arrangement of a plurality of main ropes. The mounting means controls the disturbing oscillation that could be generated by the mutual hitting of ropes in the elevator.

The portable measuring device comprises the traveling-wave passage information computing means for computing passage information of the traveling wave based on the output from the traveling wave detector means, the adjustment quantity computing means for computing a rope tension adjustment quantity based on the traveling-wave passage information computed by the traveling-wave passage information computing means, and output means for outputting the computed adjustment quantity. The traveling wave that is generated in the main rope in response to the application of an instantaneous displacement is detected, the traveling-wave passage information in the main rope is computed based on the detected signal, the rope tension adjustment quantity is computed and output in an efficient and accurate manner based on the traveling-wave passage information.

The portable measuring device further comprises the signal filter means for filtering the output from the traveling wave detector means to output a waveform, the acceleration peak of which is easily identifiable, to the traveling-wave passage information computing means. The output of the traveling-wave detector means is thus preprocessed by the signal filter means. The noise in the output from the traveling-wave detector means is reduced. Furthermore, with its integrating capability, the signal filter means provides the speed and displacement of the main rope, which helps reduce error in the traveling-wave passage information and improve measurement accuracy.

The portable measuring device further comprises the traveling-wave passage notification means which makes a sound to inform of the pass of the traveling wave based on the output from the traveling-wave passage information computing means. The portable measuring device thus notifies the technician of the pass of the traveling wave. The technician can easily determine the success or failure in the measurement by means of the sound. The technician can thus precisely determine the check and adjustment result in a narrow space and under insufficient lighting conditions above the top of the car. The efficiency in the check and adjustment operation is thus enhanced.

The portable measuring device further comprises the alarm sound generator means for sounding an alarm based on the output from the adjustment quantity computing means when the adjustment quantity exceeds a set level. When the variation of a plurality of adjustment quantities exceeds the target adjustment range, an alarm sound is given off. The technician can thus precisely determine the check and adjustment result in a narrow space and under insufficient lighting conditions above the top of the car. The efficiency in the check and adjustment operation is thus enhanced.

The portable measuring device further comprises the power supply means for supplying power to the internal arrangements in the traveling wave detector means and the portable measuring device. The portable measuring device provides portability and enhances the efficiency in the check and adjustment operation.

The traveling-wave passage information computing means estimates the return time of the traveling wave based on one of the maximum acceleration peak value search method, the power spectrum computing method using the fast Fourier transform, the auto-correlation function computing method, and the cepstrum computing method, and computes the passage velocity of the traveling wave. The passage and the return time of the traveling wave are thus precisely measured.

The traveling-wave passage information computing means comprises the traveling-wave passage velocity computing means for computing the passage velocity of the traveling wave based on the output from the traveling wave detector means, and the adjustment quantity computing means comprises the rope tension computing means for computing the tension of the main rope based on the passage velocity of the traveling wave, and the output means outputs the computation result of rope tension.

Thus, detecting the traveling wave, the rope tension measuring apparatus measures efficiently and accurately the traveling wave passage velocity and rope tension.

The traveling-wave passage information computing means comprises the traveling-wave return time computing means for computing the return time of the traveling wave based on the output from the traveling wave detector means, and the adjustment quantity computing means comprises spring adjustment quantity computing means for computing an adjustment quantity for the main rope tension adjusting spring, and the output means outputs the computation result of spring adjustment quantity. Thus, detecting the traveling wave, the rope tension measuring apparatus measures efficiently and accurately the traveling wave return time and the adjustment quantity for the main rope tension adjusting spring. This arrangement makes it unnecessary to compute rope tension of ropes that needs no adjustment.

The spring adjustment quantity computing means computes the length of the main rope at an arbitrary position of measurement based on the overall weight of the car, and computes the adjustment quantity for the rope tension adjusting spring of the main rope based on the computed length of the main rope. The rope tension measuring apparatus can measure at an arbitrary position without the data of the rope length at the arbitrary position of measurement.

The spring adjustment quantity computing means computes the adjustment quantity for the rope tension adjusting spring of the main rope based on an separation between different points of measurement along the main rope and a difference between passage times of the traveling wave at the points of measurement along the main rope. A high-accuracy measurement is allowed without the data of the rope length and overall weight of the car.

The spring adjustment quantity means computes the return time of the traveling wave for all main ropes when the spring is adjusted according to the computed spring adjustment quantity, computes the assessment of variations based on the maximum and minimum values of the return time, and computes the number of adjustment ropes to be adjusted, the computed assessment value of which falls within an adjustment target range, and indicates the spring adjustment quantities of the adjustment ropes in the order of decreasing magnitude of the absolute values of the spring adjustment quantities. The number of springs to be adjusted is reduced.

The spring adjustment computing means comprises the partial wear computing means for computing a partial wear of the sheave of the hoist rope pulley for driving the main rope by wrapping according to the difference between the spring adjustment quantities measured at different points measurement along the main rope, and the output means outputs the computation result of these partial wear quantities. The partial wear amount of the hoist rope pulley sheave is computed, serving as a reference for replacement and adjustment of the sheave.

The rope tension measuring apparatus for use with an elevator of the present invention of the type that measures the tension of the main rope that suspends a car and a counterweight, comprises the oscillation detector means for detecting the rope oscillation occurring in the main rope while the elevator runs, the computing means for computing a rope tension of the main rope or an adjustment quantity for the rope tension adjusting spring, and output means for outputting the computation result from the computing means. Variation of tension in a plurality of ropes at the car side and the counterweight side is efficiently measured when the elevator is running, without the need for the technician to apply a displacement to the main ropes.

The rope tension measuring apparatus for use with an elevator of the present invention of the type that measures the tension of the main rope that suspends a car and a counterweight, comprises the oscillation detector means for detecting the rope oscillation occurring in the main rope when the elevator starts running from a stop state, or when the elevator stops running from a running state, the computing means for computing a rope tension of the main rope or an adjustment quantity for the rope tension adjusting spring, and output means for outputting the computation result from the computing means. Variation of tension in a plurality of ropes at the car side and the counterweight side is efficiently measured when the elevator when the elevator starts running from a stop state, or when the elevator stops running from a running state, without the need for the technician to apply a displacement to the main ropes.

What is claimed is:

1. A rope tension measuring apparatus for use with an elevator of the type that measures a rope tension of a main rope that suspends a car and a counterweight, comprising:

travelling wave detector means for detecting a travelling wave occurring in the main rope in response to a displacement that is applied to the main rope and for outputting a detector output signal; and a portable measuring device that computes and outputs at least one calculated value corresponding to said rope tension based on the detector output signal from the travelling wave detector means, wherein the portable measuring device comprises:
   traveling-wave passage information computing means for computing passage information including at least a return time of the traveling wave based on the detector output signal from said traveling wave detector means, adjustment quantity computing means for computing a rope tension adjustment quantity including at least a spring adjustment quantity for a main rope tension adjusting spring based on said passage information, and output means for outputting a first calculation value of the spring adjustment quantity.

2. The rope tension measuring apparatus for use with an elevator according to claim 1, wherein said travelling wave detector means is an acceleration detector means that detects a passage of the travelling wave based on a detection of a maximum amplitude of an acceleration of the travelling wave that occurs in a perpendicular direction which is substantially perpendicular to the main rope each time the travelling wave returns.

3. The rope tension measuring apparatus for use with an elevator according to claim 1, further comprising:

mounting means for mounting said travelling wave detector means in a perpendicular direction which is substantially perpendicular to a plane of a parallel arrangement of a plurality of main ropes.

4. The rope tension measuring apparatus for use with an elevator according to claim 1, wherein the traveling-wave passage information computing means estimates the return time of the traveling wave based on one of a maximum acceleration peak value search method, a power spectrum computing method using the fast Fourier transform, an auto-correlation function computing method, and a cepstrum computing method.

5. The rope tension measuring apparatus for use with an elevator according to claim 1, wherein said portable measuring device further comprises:

power supply means for supplying power to internal components of said traveling wave detector means and the portable measuring device.

6. The rope tension measuring apparatus for use with an elevator according to claim 1, wherein said portable measuring device further comprises:

signal filter means for filtering the detector output signal from said traveling wave detector means to output a waveform to the traveling-wave passage information computing means, wherein an acceleration peak of said waveform is easily identifiable.

7. The rope tension measuring apparatus for use with an elevator according to claim 1, said portable measuring device further comprises:

traveling-wave passage notification means which makes a sound to inform of the passage of the traveling wave based on the passage information output from the traveling-wave passage information computing means.

8. The rope tension measuring apparatus for use with an elevator according to claim 1, wherein said portable measuring device further comprises:

alarm sound generator means for sounding an alarm based on the rope tension adjustment quantity output from the adjustment quantity computing means when the rope tension adjustment quantity exceeds a predetermined level.

9. The rope tension measuring apparatus for use with an elevator according to claim 1, wherein the adjustment quantity computing means comprises:

a spring adjustment quantity computing unit for computing the spring adjustment quantity for the main rope tension adjusting spring based on an separation between different points of measurement along the main rope and a difference between passage times of the traveling wave at the points of measurement along the main rope.

10. The rope tension measuring apparatus for use with an elevator according to claim 1, wherein the adjustment quantity computing means comprises:

a return time computing unit for computing the return time of the traveling wave for all main ropes, an assessment value computing unit for computing an assessment value of variation based on maximum and minimum values of the return times, an adjustment rope count computing means for computing a number of adjustment ropes to be adjusted, wherein the adjustment ropes include the main rope and at least a second main rope and wherein the computed assessment values of the adjustment ropes to be adjusted fall within an adjustment target range, and a spring adjustment quantity indicator for indicating spring adjustment quantities of the adjustment ropes to be adjusted in an order of decreasing magnitude of absolute values of the spring adjustment quantities.

11. The rope tension measuring apparatus for use with an elevator according to claim 1, wherein:

the adjustment quantity computing means comprises first and second partial wear computing means for computing a partial wear of a hoist rope pulley for driving the main rope by wrapping, according to the difference between the spring adjustment quantities of springs of a car side and a counterweight side measured at different points of measurement along the main rope, and the output means outputs a second calculation value of the partial wear quantities.

12. The rope tension measuring apparatus for use with an elevator according to claim 1, wherein the adjustment quantity computing means comprises:

a main rope length computing unit for computing a length of the main rope at an arbitrary position of measurement based on a weight of the car, and a spring adjustment quantity computing unit for computing the spring adjustment quantity for the main rope tension adjusting spring based on the length of the main rope computed by the main rope length computing unit.

* * * * *